US012763365B2

(12) United States Patent
Peng et al.

(10) Patent No.: US 12,763,365 B2
(45) Date of Patent: Oct. 13, 2026

(54) ELECTROLYTIC SOLUTION, ELECTROCHEMICAL DEVICE, AND ELECTRONIC DEVICE

(71) Applicant: Dongguan Amperex Technology Limited, Dongguan City (CN)

(72) Inventors: Xiexue Peng, Dongguan City (CN); Jianming Zheng, Dongguan City (CN); Chao Tang, Dongguan City (CN)

(73) Assignee: Dongguan Amperex Technology Limited, Dongguan City (CN)

(*) Notice: Subject to any disclaimer, the term of this patent is extended or adjusted under 35 U.S.C. 154(b) by 707 days.

(21) Appl. No.: 18/128,355

(22) Filed: Mar. 30, 2023

(65) Prior Publication Data

US 2023/0261263 A1 Aug. 17, 2023

Related U.S. Application Data

(63) Continuation of application No. PCT/CN2021/095797, filed on May 25, 2021.

(30) Foreign Application Priority Data

Dec. 29, 2020 (CN) ......................... 202011595106.2

(51) Int. Cl.
*H01M 10/0567* (2010.01)

(52) U.S. Cl.
CPC ............................... *H01M 10/0567* (2013.01)

(58) Field of Classification Search
CPC ..... H01G 11/06; H01G 11/64; H01M 10/052; H01M 10/0525; H01M 10/0567; H01M 10/0569; H01M 10/4235; H01M 2220/20; H01M 2220/30
USPC .......................................................... 429/188
See application file for complete search history.

(56) References Cited

U.S. PATENT DOCUMENTS

| | | | | |
|---|---|---|---|---|
| 10,608,283 | B2 | 3/2020 | Park et al. | |
| 2014/0134480 | A1 | 5/2014 | Khasanov et al. | |
| 2017/0288268 | A1 | 10/2017 | Kim et al. | |
| 2018/0233778 | A1* | 8/2018 | Park | H01M 10/0567 |
| 2020/0006810 | A1 | 1/2020 | Lee et al. | |

FOREIGN PATENT DOCUMENTS

| | | | | | |
|---|---|---|---|---|---|
| CN | 108428940 | A | | 8/2018 | |
| CN | 109687024 | A | | 4/2019 | |
| CN | 109860703 | A | * | 6/2019 | H01M 10/0525 |
| CN | 110380120 | A | | 10/2019 | |
| CN | 111342129 | A | | 6/2020 | |
| CN | 111342135 | A | | 6/2020 | |
| CN | 112119530 | A | | 12/2020 | |
| CN | 112751081 | A | | 5/2021 | |
| CN | 113130988 | A | | 7/2021 | |
| CN | 113161601 | A | | 7/2021 | |
| DE | 102017107257 | A1 | | 10/2018 | |
| EP | 2683015 | A1 | | 1/2014 | |
| JP | 2003086248 | A | | 3/2003 | |
| JP | 2014093201 | A | | 5/2014 | |
| JP | 2018120854 | A | * | 8/2018 | |

OTHER PUBLICATIONS

JP 2018120854 A-Machine translation, retrieved on Oct. 2025 (Year: 2025).*

(Continued)

*Primary Examiner* — Nicole M. Buie-Hatcher
*Assistant Examiner* — Gilberto Ramos Rivera
(74) *Attorney, Agent, or Firm* — WHDA, LLP

(57) ABSTRACT

An electrolytic solution, including at least one of compounds represented by Formula (I-A). In Formula (I-A), n is an integer selected from 0 to 6; $A_1$, $A_2$, and $A_3$ each are a structural formula represented by Formula (I-B) or Formula (I-C). In Formula (I-A), a number of —CN functional groups is 5 to 10, and a number of

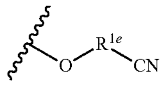

is greater than or equal to 1. The electrolytic solution is applicable to an electrochemical device, so that the electrochemical device can maintain good high-temperature storage performance, cycle performance, floating charge performance, and overcharge performance while achieving a relatively high energy density.

(I-A)

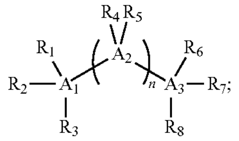

(I-B)

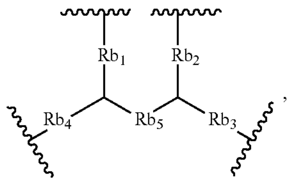

, and (I-C)

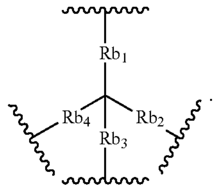

17 Claims, No Drawings

(56) References Cited

OTHER PUBLICATIONS

CN 109860703 A—Machine translation, retrieved in May 2026 (Year: 2026).*
JP 2018120854 A—Machine translation, retrieved in Oct. 2025 (Year: 2025).*
International Search Report dated Sep. 10, 2021, issued in counterpart Application No. PCT/CN2021/095797, with English Translation. (7 pages).
Office Action dated Dec. 3, 2021, issued in counterpart CN Application No. 202011595106.2, with English Translation. (21 pages).
Notice of Allowance dated Aug. 8, 2022, issued in counterpart CN Application No. 202011595106.2, with English Translation. (7 pages).
Office Action dated Apr. 25, 2023, issued in counterpart JP Application No. 2021-546870. (3 pages).
Ma, Q. et al., Highly Conductive Electrolytes Derived from Nitrile Solvents, Journal of the Electrochemical Society, vol. 162, No. 7, p. A1276-A1281, 2015. (8 pages); cited in JP Office Action dated Apr. 25, 2023.
Liu, Y. et al., Fundamental Scientific aspects of lithium ion batteries (IX)—Nonaqueous electrolyte materials, Energy Storage Science and Technology, vol. 3, No. 3, p. 262-282, May 2014, with English Abstract. (21 pages); cited in CN Notice of Allowance dated Aug. 8, 2022, previously filed on Apr. 4, 2023.

* cited by examiner

ELECTROLYTIC SOLUTION, ELECTROCHEMICAL DEVICE, AND ELECTRONIC DEVICE

CROSS REFERENCE TO RELATED APPLICATIONS

This application is a Continuation of copending PCT International Application No. PCT/CN2021/095797 filed on May 25, 2021, which designated the United States, and on which priority is claimed under 35 U.S.C. § 120. This application also claims priority under 35 U.S.C. § 119(a) on Patent Application No. 202011595106.2 filed in China on Dec. 29, 2020. The entire contents of each of the above documents is hereby incorporated by reference into the present application.

TECHNICAL FIELD

This application relates to an electrolytic solution, an electrochemical device, and an electronic device.

BACKGROUND

Electrochemical devices, such as a lithium-ion battery, are characterized by a high energy density, a low maintenance cost, a low self-discharge rate, a wide range of working temperature, a long cycle life, no memory effect, a stable working voltage, environmental friendliness, and the like, and therefore, are widely used the fields such as smart products (including electronic products such as a mobile phone, a notebook computer, and a camera), electric tools, and electric vehicles.

With the rapid development of technology and the diversity of market demand, people have posed higher requirements on the performance of the electrochemical devices. For example, higher safety and a higher energy density are required.

The foregoing description merely provides background technologies, but the foregoing "background technologies" are not recognized as existing technologies of this application.

SUMMARY

In some embodiments, this application provides an electrolytic solution, including at least one of compounds represented by Formula (I-A):

(I-A)

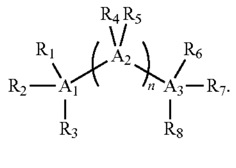

In Formula (I-A), n is an integer selected from 0 to 6; $A_1$, $A_2$, and $A_3$ each are a structural formula represented by Formula (I-B) or Formula (I-C):

(I-B)

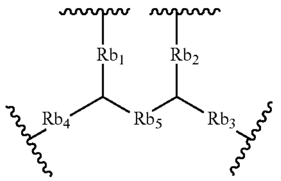

, and

-continued (I-C)

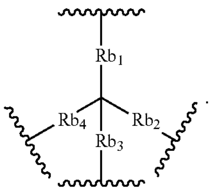

$R_1$, $R_2$, $R_3$, $R_4$, $R_5$, $R_6$, $R_7$, and $R_8$ each are any one independently selected from hydrogen, halogen, a cyano group,

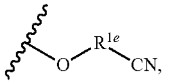

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution includes at least one of the halogen, the cyano group, or

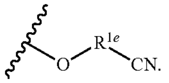

In Formula (I-A), a number of —CN functional groups is 5 to 10, and a number of

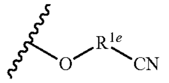

is greater than or equal to 1. $R_{b1}$, $R_{b2}$, $R_{b3}$, $R_{b4}$, $R_{b5}$, and $R^{1e}$ each are independently selected from a covalent single bond, a substituted or unsubstituted $C_1$ to $C_{10}$ alkylidene, a substituted or unsubstituted $C_2$ to $C_{10}$ alkenylene, a substituted or unsubstituted $C_2$ to $C_{10}$ alkynylene, or a substituted or unsubstituted $C_6$ to $C_{10}$ arylene, in which a substituent for substitution is halogen, where,

represents a site of bonding with an adjacent atom.

In some embodiments, the compounds represented by Formula (I-A) are at least one selected from compounds represented by Formula (I-A1), Formula (I-A2), Formula (I-A3), Formula (I-A), Formula (I-A5), and Formula (I-A6):

(I-A1)

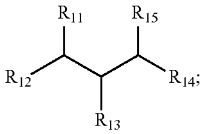

-continued (I-A2)

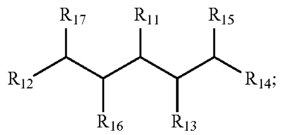

(I-A3)

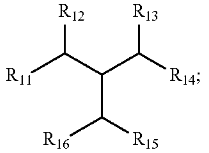

(I-A4)

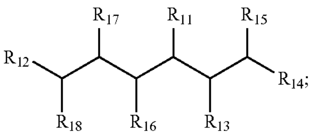

(I-A5)

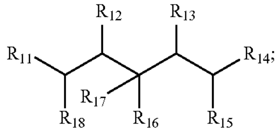

and (I-A6)

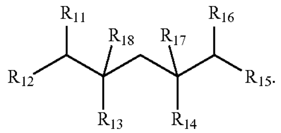

In Formula (I-A1), Formula (I-A2), Formula (I-A3), Formula (I-A4), Formula (I-A5), and Formula (I-A6), $R_{11}$, $R_{12}$, $R_{13}$, $R_{14}$, $R_{15}$, $R_{16}$, $R_{17}$, and $R_{18}$ each are any one independently selected from hydrogen, halogen, a cyano group,

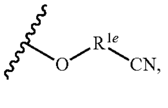

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted CE to $C_{10}$ aryl, in which a substituent for substitution includes at least one of the halogen, the cyano group, or

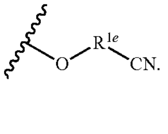

Further, in each of Formula (I-A1), Formula (I-A2), Formula (I-A3), Formula (I-A4), Formula (I-A5), and Formula (I-A6), a number of —CN functional groups is 5 to 10, and a number of

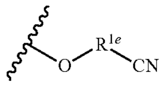

is greater than or equal to 1.

In some embodiments, the compounds represented by Formula (I-A) are at least one selected from compounds represented by Formula (I-A7), Formula (I-A8). Formula (I-A9), or Formula (I-A10):

(I-A7)

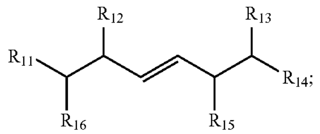

(I-A8)

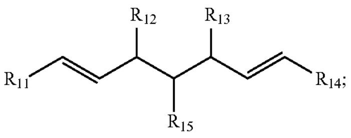

(I-A9)

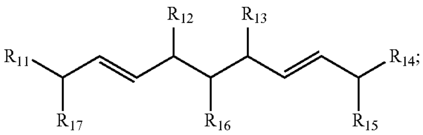

and (I-A10)

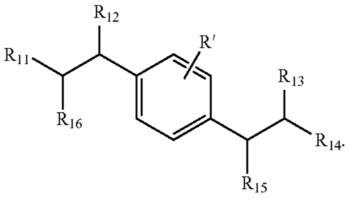

In Formula (I-A7), Formula (I-A8), Formula (I-A9), and Formula (I-A10), $R_{11}$, $R_{12}$, $R_{13}$, $R_{14}$, $R_{15}$, $R_{16}$, $R_{17}$ each are any one independently selected from hydrogen, halogen, a cyano group,

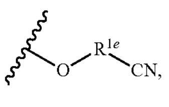

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl. R' is selected from hydrogen or a substituted or unsubstituted $C_1$ to $C_{10}$ alkyl, in which a substituent for substitution includes at least one of the halogen, the cyano group, or

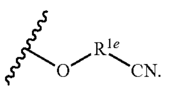

Further, in each of Formula (I-A7), Formula (I-A8), Formula (I-A9), and Formula (I-A10), a number of —CN functional groups is 5 to 10, and a number of
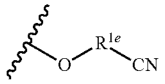
is greater than or equal to 1.
In some embodiments, the compounds represented by Formula (I-A) include at least one of compounds represented by Formula (I-1) to Formula (I-20):
(I-1)
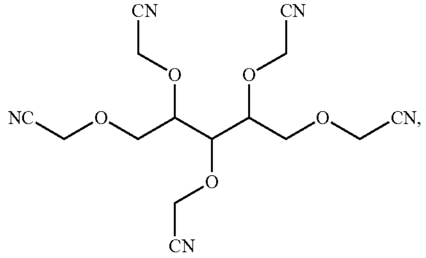
(I-2)
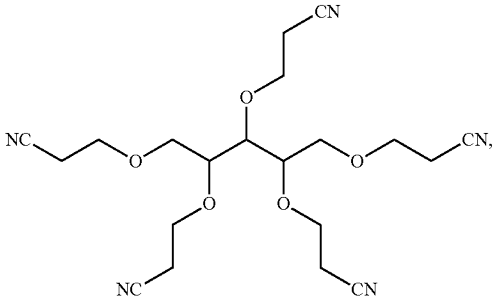
(I-3)
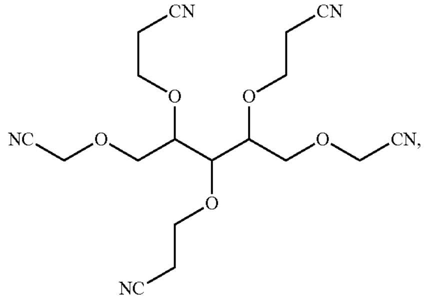
(I-4)
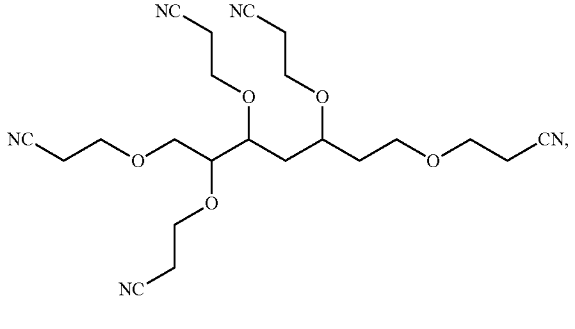
-continued
(I-5)
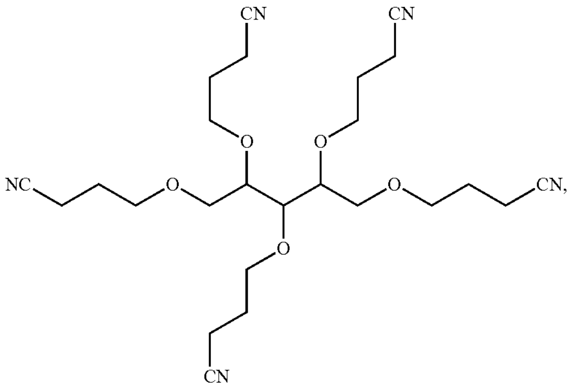
(I-6)
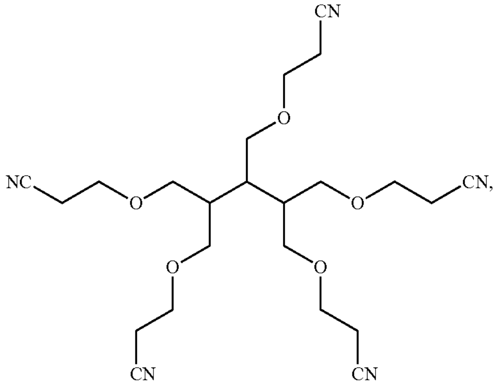
(I-7)
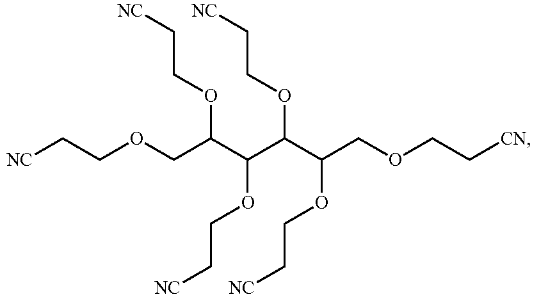
(I-8)
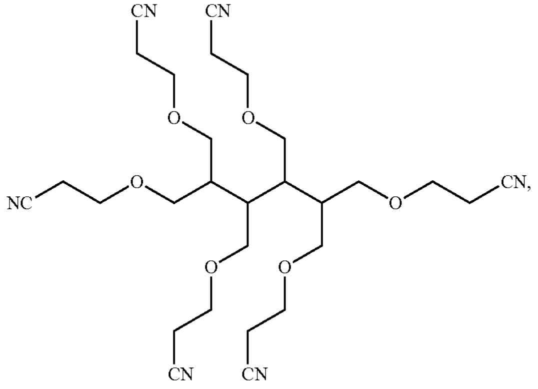

-continued
(I-9)
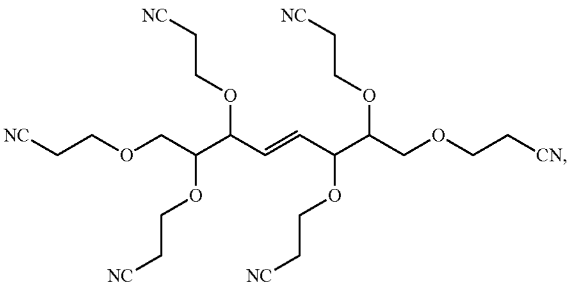
(I-10)
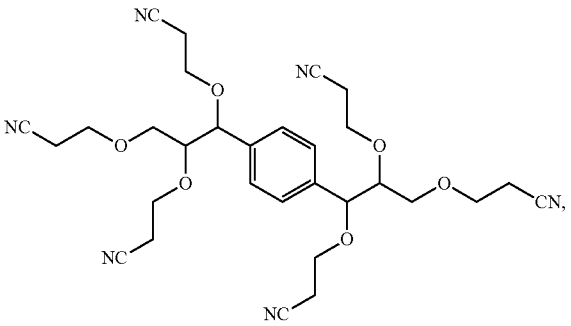
(I-11)
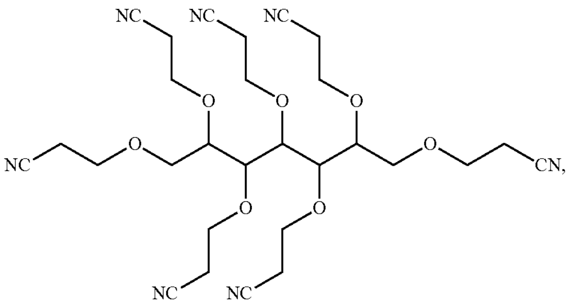
(I-12)
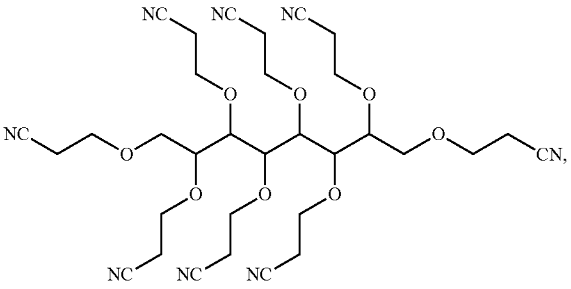
(I-13)
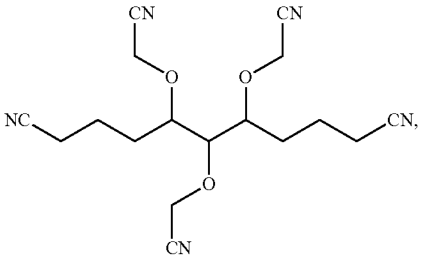
-continued
(I-14)
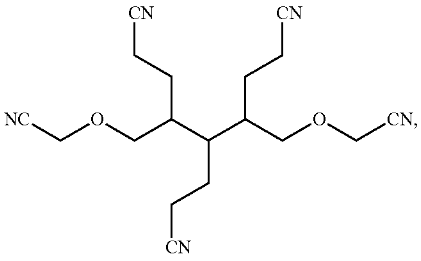
(I-15)
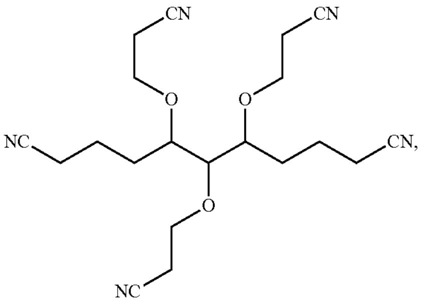
(I-16)
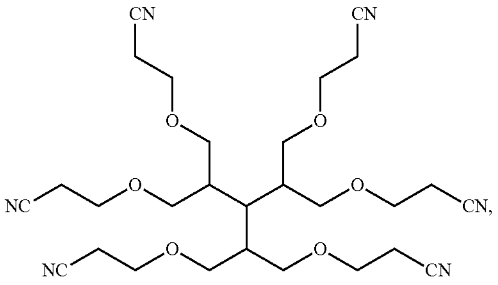
(I-17)
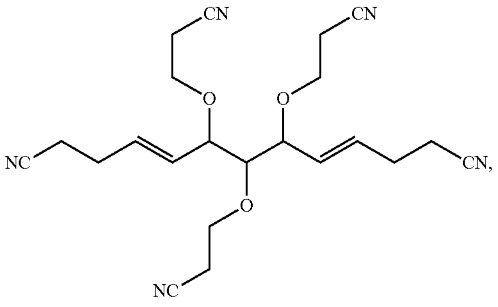
(I-18)
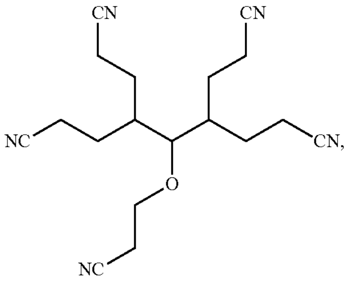

-continued (I-19)

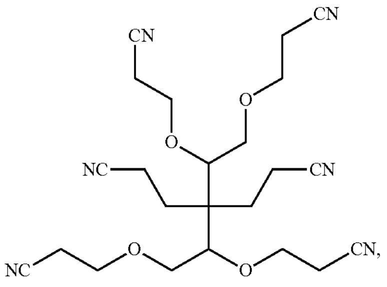

and (I-20)

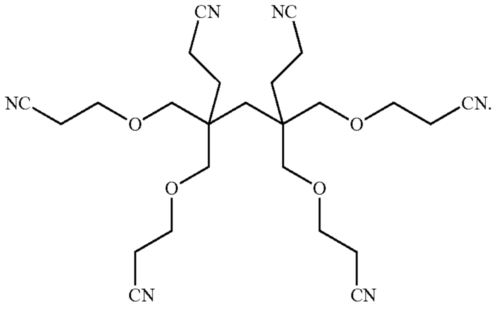

In some embodiments, based on a mass of the electrolytic solution, a weight percent of a compound represented by Formula (I-A) is 0.1% to 10%.

In some embodiments, based on a mass of the electrolytic solution, a weight percent of a compound represented by Formula (I-A) is 0.1% to 5%.

In some embodiments, the electrolytic solution further includes at least one of compounds represented by Formula (II-A):

(II-A)

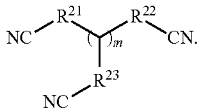

In Formula (II-A), m is selected from 0 or 1; $R^{21}$, $R^{22}$, and $R^{23}$ each are any one independently selected from

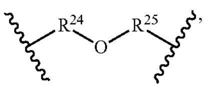

a substituted or unsubstituted $C_1$ to $C_{10}$ alkylidene or a substituted or unsubstituted $C_2$ to $C_{10}$ alkenylene, in which a substituent for substitution is halogen. $R^{24}$ and $R^{25}$ each are any one independently selected from a covalent bond, a substituted or unsubstituted $C_1$ to $C_{10}$ alkylidene, or a substituted or unsubstituted $C_2$ to $C_{10}$ alkenylene, in which a substituent for substitution is halogen, where

represents a site of bonding with an adjacent atom.

In some embodiments, the compounds represented by Formula (II-A) include at least one of compounds represented b Formula (II-1) to Formula (II-12):

(II-1)

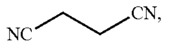

(II-2)

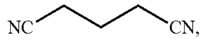

(II-3)

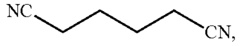

(II-4)

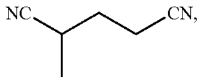

(II-5)

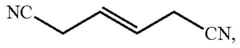

(II-6)

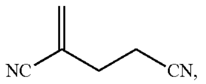

(II-7)

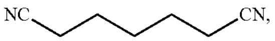

(II-8)

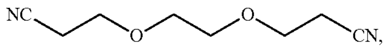

(II-9)

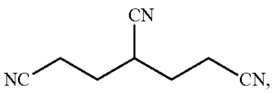

(II-10)

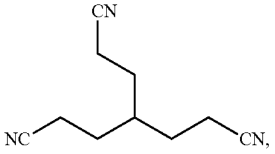

(II-11)

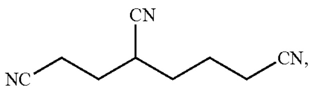

and (II-12)

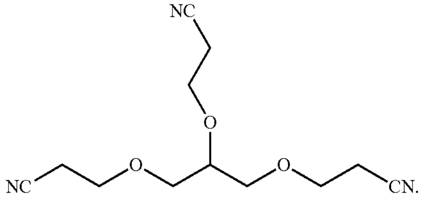

In some embodiments, based on the mass of the electrolytic solution, the weight percent of the compound represented by Formula (II-A) is 0.1% to 10%.

In some embodiments, a mass ratio of the compound represented by Formula (I-A) to the compound represented by Formula (II-A) is less than or equal to 1.

In some embodiments, the electrolytic solution further includes at least one of compounds represented by Formula (III-A):

(III-A)

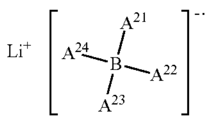

In Formula (III-A), $A^{21}$, $A^{22}$, $A^{23}$, and $A^{24}$ each are any one independently selected from halogen or a structural formula represented by Formula (III-B), Formula (III-C), or Formula (III-D):

(III-B)

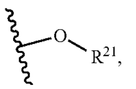

(III-C)

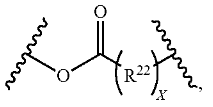

and (III-D)

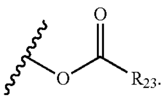

x is selected from 0 or 1. $R^{21}$ and $R^{23}$ each are independently selected from a substituted or unsubstituted $C_1$ to $C_6$ alkyl or a substituted or unsubstituted $C_2$ to $C_6$ alkenyl, in which a substituent for substitution is halogen. $R^{22}$ is selected from a substituted or unsubstituted $C_1$ to $C_6$ alkylidene or a substituted or unsubstituted $C_2$ to $C_6$ alkenylene, in which a substituent for substitution is halogen. When $A^{21}$, $A^{22}$, $A^{23}$, and $A^{24}$ are selected from the structural formulas represented by Formula (III-C), 2 or 4 of $A^{21}$, $A^{22}$, $A^{23}$, or $A^{24}$ are independently selected from the structural formulas represented by Formula (III-C) concurrently. Every two structural formulas represented by Formula (III-C) can bond with each other to form a cyclic structure. An O atom adjacent to

in Formula (III-C) is connected to a B atom at the center of Formula (III-A).

represents a site of bonding with an adjacent atom.

In some embodiments, the compounds represented by Formula (III-A) include at least one of compounds represented by Formula (III-1) to Formula (III-12):

(III-1)

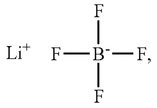

(III-2)

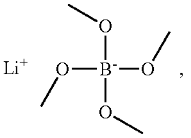

(III-3)

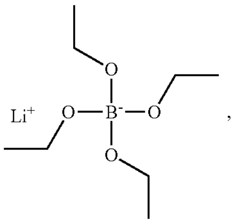

(III-4)

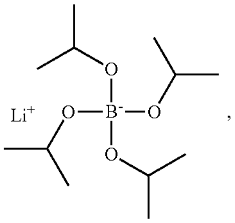

(III-5)

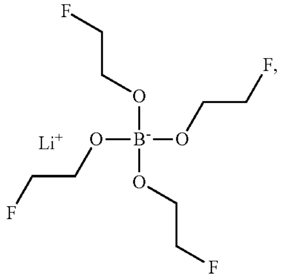

(III-6)

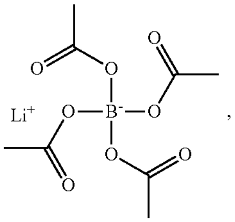

(III-7)

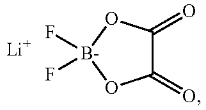

(III-8)

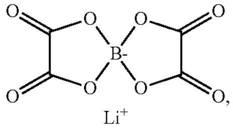

-continued (III-9)

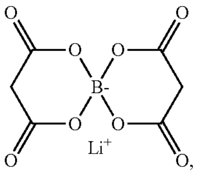

(III-10)

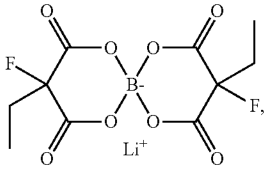

(III-11)

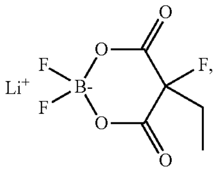

and (III-12)

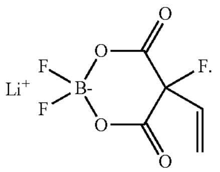

In some embodiments, the electrolytic solution further includes a compound containing a sulfur-oxygen double bond, and the compound containing a sulfur-oxygen double bond includes at least one of compounds represented by Formula (IV-A) or Formula (IV-B):

(IV-A)

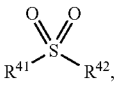

and (IV-B)

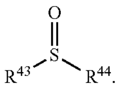

In Formula (IV-A) and Formula (IV-B), $R^{41}$, $R^{42}$, $R^{43}$, and $R^{44}$ each are independently selected from a substituted or unsubstituted $C_1$ to $C_5$ alkyl, a substituted or unsubstituted $C_2$ to $C_{10}$ alkenyl, a substituted or unsubstituted $C_2$ to $C_{10}$ alkynyl, a substituted or unsubstituted $C_3$ to $C_{10}$ alicyclic hydrocarbyl, a substituted or unsubstituted $C_6$ to $C_{10}$ aryl, or a substituted or unsubstituted $C_1$ to $C_6$ heterocyclic group, in which a substituent for substitution includes at least one of halogen or a heteroatom-containing functional group. $R^{41}$ and $R^{42}$ are able to be bonded to form a cyclic structure, and $R^{43}$ and $R^{44}$ are able to be bonded to form a cyclic structure.

In some embodiments, the compound containing a sulfur-oxygen double bond includes at least one of compounds represented by Formula (IV-1) to Formula (IV-16):

(IV-1)

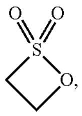

(IV-2)

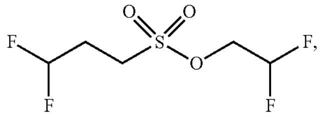

(IV-3)

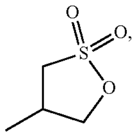

(IV-4)

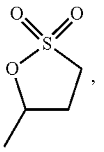

(IV-5)

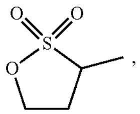

(IV-6)

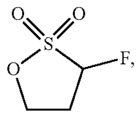

(IV-7)

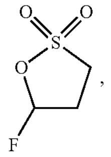

(IV-8)

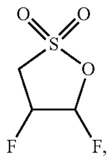

(IV-9)

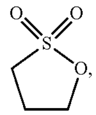

(IV-10)

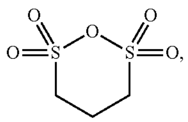

-continued (IV-11)

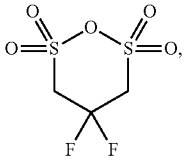

(IV-13)

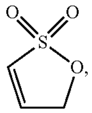

(IV-14)

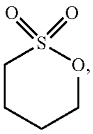

(IV-15)

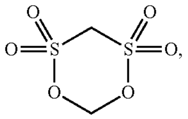 and (IV-16)

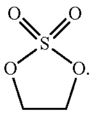

In some embodiments, the electrolytic solution further includes a lithium phosphate compound. The lithium phosphate compound includes at least one of lithium difluorophosphate, lithium difluorobisoxalate phosphate, or lithium tetrafluorooxalate phosphate.

In some embodiments, this application further provides an electrochemical device, including a positive electrode plate, a negative electrode plate, a separator, and the foregoing electrolytic solution.

In some embodiments, this application further provides an electronic device, including the foregoing electrochemical device.

DETAILED DESCRIPTION

Understandably, the disclosed embodiments are merely examples of this application, and this application may be implemented in various forms. Therefore, the details disclosed herein are not to be construed as a limitation, but are merely intended as a basis of the claims and as a representative basis for teaching a person of ordinary skill in the art to implement this application in various forms.

In the context of this application, unless otherwise expressly specified and defined, the terms such as "first", "second", "third", "fourth", "fifth", and "sixth" are merely used for ease of description, but are not to be understood as indicating or implying relative importance and mutual relationships.

In the context of this application, unless otherwise specified, functional groups of all compounds may be substituted or unsubstituted.

In the context of this application, the term "heteroatom" means an atom other than C and H. In some embodiments, the heteroatom includes at least one of B, N, O, Si, P, or S.

In the context of this application, the term "heterocyclic group" means a cyclic group containing at least one heteroatom. In some embodiments, the heterocyclic group includes at least one of an aliphatic heterocyclic group or an aromatic heterocyclic group.

In the context of this application, the term "heteroatom-containing functional group" means a functional group containing at least one heteroatom.

In the context of this application, the term "alkylidene" means a divalent alkyl, the term "alkenylene" means a divalent alkenyl, the term "alkynylene" means a divalent alkynyl, and the term "arylene" means a divalent aryl.

In the context of this application, the term "alicyclic hydrocarbyl" means a cyclohydrocarbyl of aliphatic properties, and a molecule thereof contains a closed carbocyclic ring.

(Electrolytic Solution)

[First Additive]

In some embodiments, the electrolytic solution includes a first additive. The first additive includes at least one of the compounds represented by Formula (I-A):

(I-A)

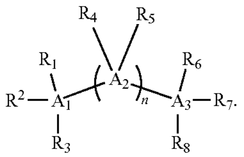

In Formula (I-A), n is an integer selected from 0 to 6; $A_1$, $A_2$, and $A_3$ each are a structural formula represented by Formula (I-B) or Formula (I-C):

(I-B)

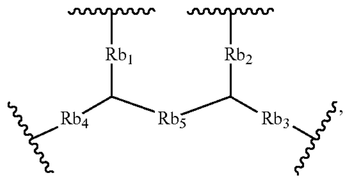

(I-C)

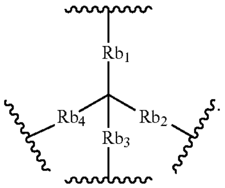

$R_1$, $R_2$, $R_3$, $R_4$, $R_5$, $R_6$, $R_7$, and $R_8$ each are any one independently selected from hydrogen, halogen, a cyano group,

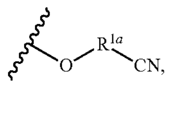

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution includes at least one of the halogen, the cyano group, or

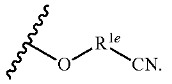

In Formula (I-A), a number of —CN functional groups is 5 to 10, and a number of

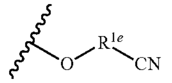

is greater than or equal to 1. $R_{b1}$, $R_{b2}$, $R_{b3}$, $R_{b4}$, $R_{b5}$, and $R^{1e}$ each are independently selected from a covalent single bond, a substituted or unsubstituted $C_1$ to $C_{10}$ alkylidene, a substituted or unsubstituted $C_2$ to $C_{10}$ alkenylene, a substituted or unsubstituted $C_2$ to $C_{10}$ alkynylene, or a substituted or unsubstituted $C_6$ to $C_{10}$ arylene, in which a substituent for substitution is halogen, where,

represents a site of bonding with an adjacent atom.

The energy density of the electrochemical device may be increased by increasing a compacted density and a gram capacity of the positive and negative electrode materials in the electrochemical device, or by increasing a working voltage of the electrochemical device. However, the increase of a charge voltage is likely to accelerate decomposition of the electrolytic solution in the electrochemical device and cause problems such as high-temperature gassing and a shortened cycle life.

In this application, the compound represented by Formula (I-A) is added into the electrolytic solution to significantly improve the high-temperature storage performance, cycle performance, floating charge performance, and overcharge performance of the electrochemical device, so that the electrochemical device can maintain good high-temperature storage performance, cycle performance, floating charge performance, and overcharge performance while achieving a relatively high energy density. In a case that the electrochemical device continues being charged after being fully charged, the electrochemical device will be in a fully charged state for a long time. This is known as floating charge. The floating charge performance of the electrochemical device directly affects reliability such as gassing, thickness expansion, and capacity attenuation. When the electrochemical device is charged at a voltage higher than a charge cut-off voltage, overcharge occurs. The overcharge performance of the electrochemical device affects safety.

The compound represented by Formula (I-A) can stabilize a transition metal on a surface of a positive active material and decrease oxidation of a high-valence transition metal, and can oxidize to form a film to provide double protection for an electrode plate. This can suppress decomposition of the electrolytic solution, and suppress high-temperature gassing. Therefore, the compound represented by Formula (I-A) added into the electrolytic solution can improve the high-temperature storage performance, cycle performance, floating charge performance, and overcharge performance of the electrochemical device that uses the electrolytic solution.

In some embodiments, the compounds represented by Formula (I-A) are at least one selected from compounds represented by Formula (I-A1), Formula (I-A2), Formula (I-A3), Formula (I-A4), Formula (I-A5), and Formula (I-A6):

(I-A1)

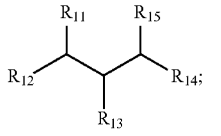

(I-A2)

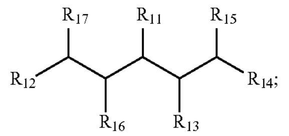

(I-A3)

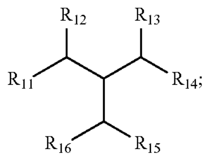

(I-A4)

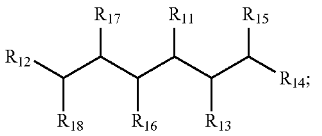

(I-A5)

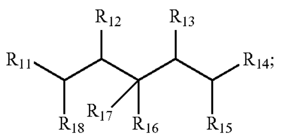

and (I-A6)

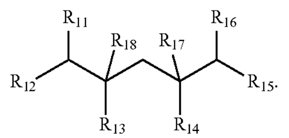

In Formula (I-A1), Formula (I-A2), Formula (I-A3), Formula (I-A4), Formula (I-A5), and Formula (I-A6), $R_{11}$, $R_{12}$, $R_{13}$, $R_{14}$, $R_{15}$, $R_{16}$, $R_{17}$ and $R_{18}$ each are any one independently selected from hydrogen, halogen, a cyano group,

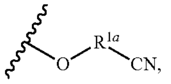

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution includes at least one of the halogen, the cyano group, or

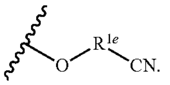

Further, in each of Formula (I-A1), Formula (I-A2), Formula (I-A3), Formula (I-A4), Formula (I-A5), and Formula (I-A6), a number of —CN functional groups is 5 to 10, and a number of

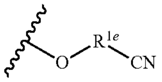

is greater than or equal to 1.

In some embodiments, the compounds represented by Formula (I-A) are at least one selected from compounds represented by Formula (I-A7), Formula (I-A8), Formula (I-A9), or Formula (I-A10):

(I-A7)

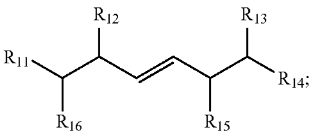

(I-A8)

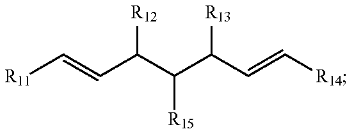

(I-A9)

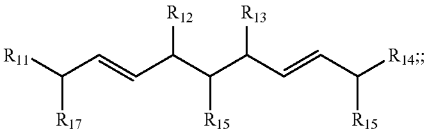

and (I-A10)

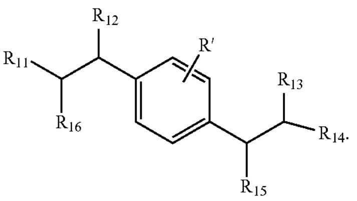

In Formula (I-A7), Formula (I-A8), Formula (I-A9), and Formula (I-A10), $R_{11}$, $R_{12}$, $R_{13}$, $R_{14}$, $R_{15}$, $R_{16}$, $R_{17}$ each are any one independently selected from hydrogen, halogen, a cyano group,

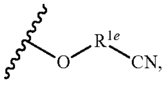

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl. R' is selected from hydrogen or a substituted or unsubstituted $C_1$ to $C_{10}$ alkyl, in which a substituent for substitution includes at least one of the halogen, the cyano group, or

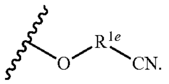

Further, in each of Formula (I-A7), Formula (I-A8), Formula (I-A9), and Formula (I-A10), a number of —CN functional groups is 5 to 10, and a number of

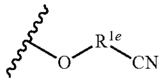

is greater than or equal to 1.

In some embodiments, the compounds represented by Formula (I-A) include at least one of compounds represented by Formula (I-1) to Formula (I-20):

(I-1)

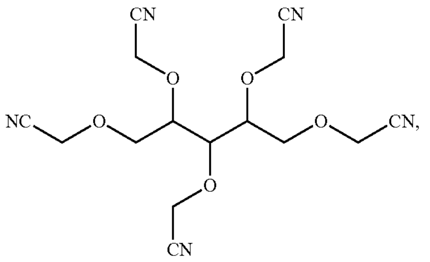

(I-2)

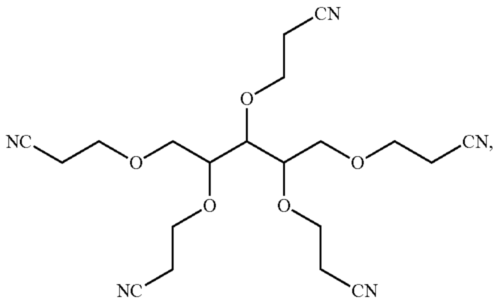

(I-3)

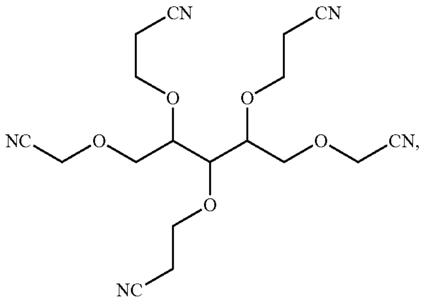

-continued
(I-4)
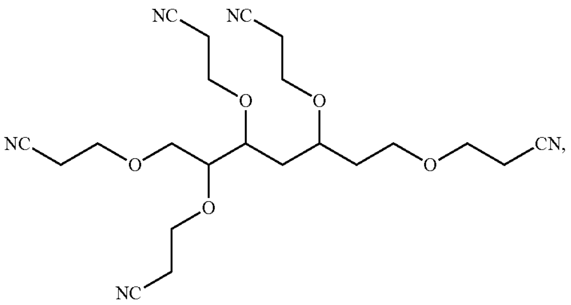
(I-5)
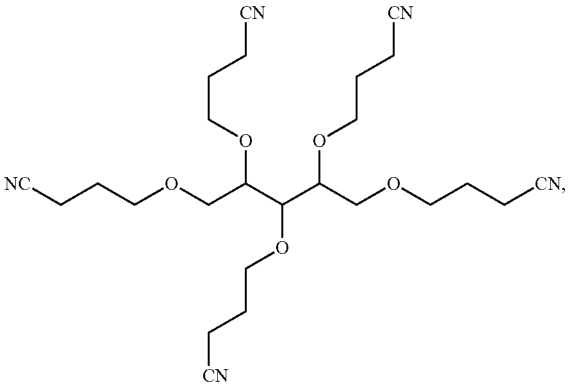
(I-6)
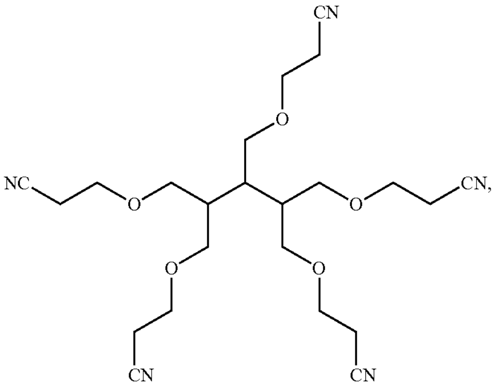
(I-7)
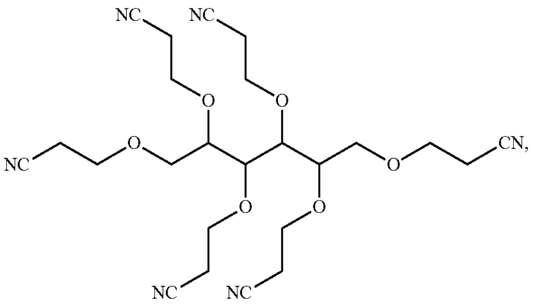
-continued
(I-8)
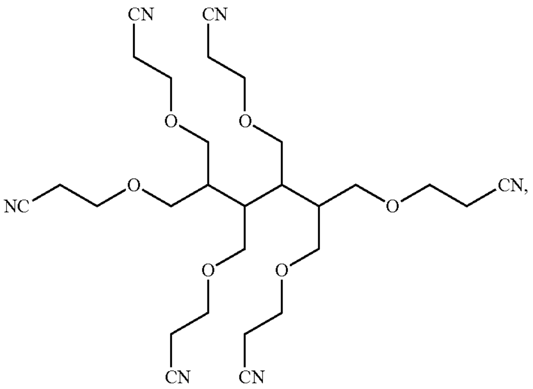
(I-9)
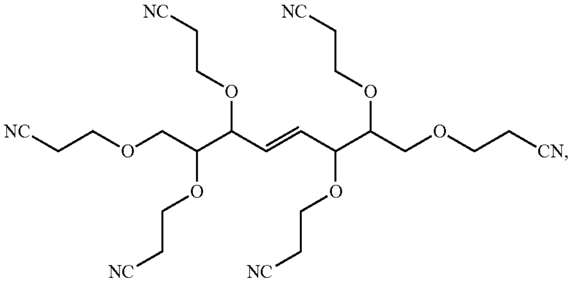
(I-10)
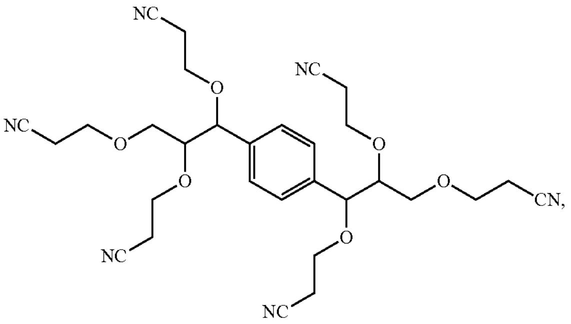
(I-11)
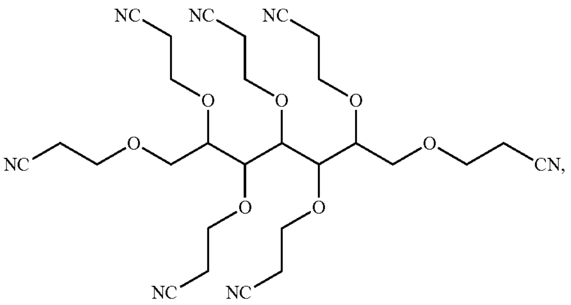

-continued (I-12)

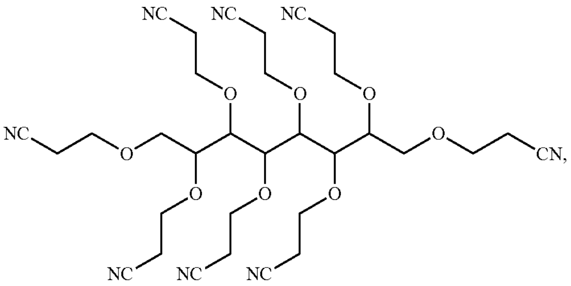

(I-13)

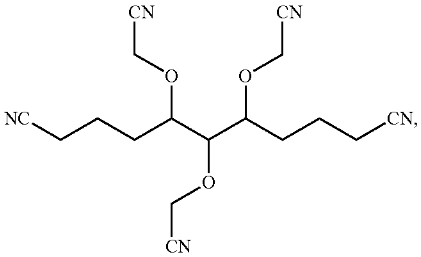

(I-14)

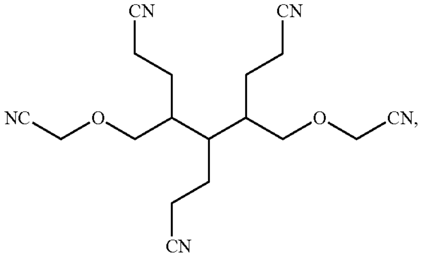

(I-15)

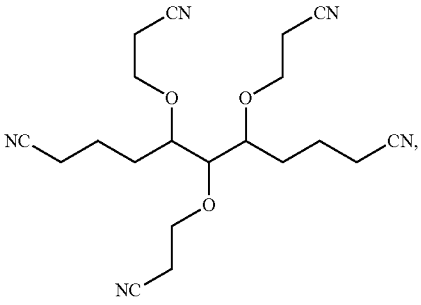

(I-16)

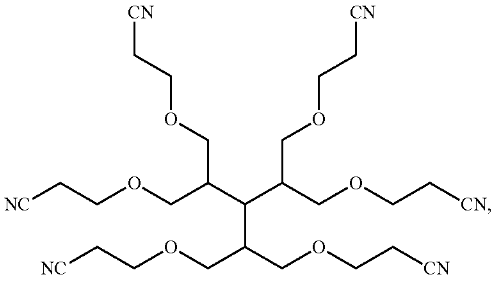

-continued (I-17)

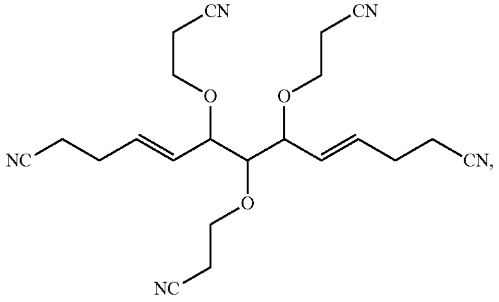

(I-18)

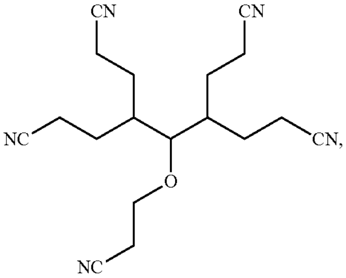

(I-19)

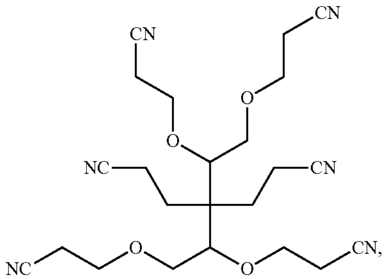

and (I-20)

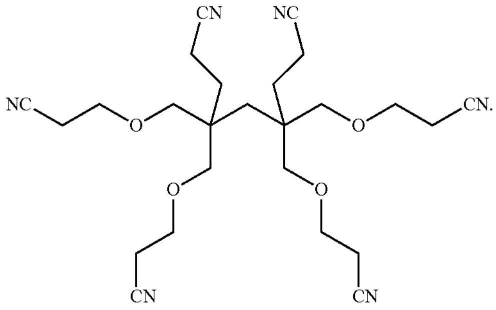

In some embodiments, based on the mass of the electrolytic solution, the weight percent of the compound represented by Formula (I-A) is 0.1% to 10%. When the weight percent of the compound represented by Formula (I-A) falls within the foregoing range, the high-temperature storage performance, cycle performance, floating charge performance, and overcharge performance of the electrochemical device can be further improved. If the weight percent of the compound represented by Formula (I-A) is too high, viscosity of the electrolytic solution will be too high, and may exert an impact on kinetic performance of the electrochemical device. If the weight percent of the compound represented by Formula (I-A) is too low, the corresponding performance will be overridden by other ingredients, and the effect of this compound may be weak. In some embodiments, based on the mass of the electrolytic solution, the weight percent of the compound represented by Formula (I-A) is 0.1% to 7%. In some embodiments, based on the mass of the electrolytic solution, the weight percent of the compound represented by Formula (I-A) is 0.1% to 5%. In some embodiments, based on the mass of the electrolytic solution, the weight percent of the compound represented by Formula (I-A) is 0.1% to 3%. In some embodiments, based on the mass of the electrolytic solution, the weight percent of the compound represented by Formula (I-A) is 1% to 7%. In some embodiments, based on the mass of the electrolytic solution, the weight percent of the compound represented by Formula (I-A) is 1% to 5%.

[Second Additive]

In some embodiments, the electrolytic solution further includes a second additive. The second additive includes at least one of the compounds represented by Formula (II-A):

(II-A)

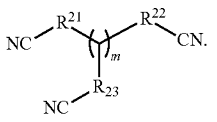

In Formula (II-A), m is selected from 0 or 1; $R^{21}$, $R^{22}$, and $R^{23}$ each are any one independently selected from

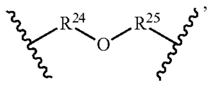, a substituted or unsubstituted $C_1$ to $C_{10}$ alkylidene or a substituted or unsubstituted $C_2$ to $C_{10}$ alkenylene, in which a substituent for substitution is halogen. $R^{24}$ and $R^{25}$ each are any one independently selected from a covalent bond, a substituted or unsubstituted $C_1$ to $C_{10}$ alkylidene, or a substituted or unsubstituted $C_2$ to $C_{10}$ alkenylene, in which a substituent for substitution is halogen, where

represents a site of bonding with an adjacent atom.

When both the first additive and the second additive are added into the electrolytic solution, the high-temperature storage performance, the floating charge performance, and the cycle performance of the electrochemical device can be further improved. Using the compound represented by Formula (I-A) together with the compound represented by Formula (I-A) can balance performance, further mitigate the impact caused by the solubility and viscosity of the electrolytic solution, reduce cost, and achieve a trade-off between performance and cost.

In some embodiments, the compounds represented by Formula (II-A) include at least one of compounds represented by Formula (II-1) to Formula (II-12):

(II-1)

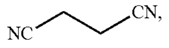

-continued (II-2)

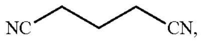

(II-3)

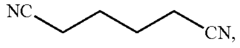

(II-4)

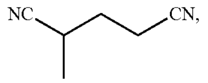

(II-5)

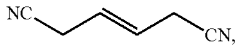

(II-6)

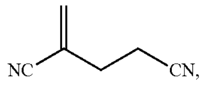

(II-7)

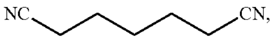

(II-8)

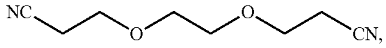

(II-9)

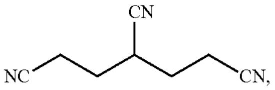

(II-10)

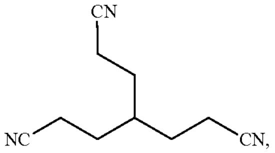

(II-11)

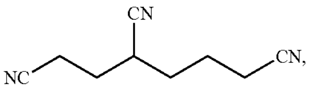

and (II-12)

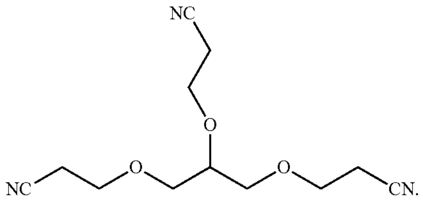

In some embodiments, based on the mass of the electrolytic solution, the weight percent of the compound represented by Formula (II-A) is 0.1% to 10%. When the weight percent of the compound represented by Formula (II-A) falls within the foregoing range, the high-temperature storage performance, floating charge performance, and cycle performance of the electrochemical device can be further improved. If the weight percent of the compound represented by Formula (II-A) is too high, the content of other ingredients in the electrolytic solution is lower, and the improvement effect is not optimal. If the weight percent of the compound represented by Formula (II-A) is too low, the effect of this compound may be weak. In some embodiments, based on the mass of the electrolytic solution, the weight percent of the compound represented by Formula (II-A) is 1% to 10%. In some embodiments, based on the mass of the electrolytic solution, the weight percent of the compound represented by Formula (II-A) is 1% to 5%.

In some embodiments, a mass ratio of the compound represented by Formula (I-A) to the compound represented by Formula (II-A) is less than or equal to 1. When the mass ratio of the compound represented by Formula (I-A) to the compound represented by Formula (II-A) falls within the foregoing range, the high-temperature storage performance, floating charge performance, and cycle performance of the electrochemical device can be further improved. If the weight percent of the compound represented by Formula (I-A) is too high, system kinetics will be affected, and then the cycle performance of the electrochemical device will be affected. In some embodiments, a mass ratio of the compound represented by Formula (I-A) to the compound represented by Formula (II-A) is (0.1 to 0.9): 1.

[Third Additive]

In some embodiments, the electrolytic solution further includes a third additive. The third additive includes at least one of the compounds represented by Formula (III-A):

(III-A)

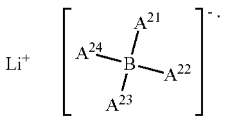

In Formula (III-A), $A^{21}$, $A^{22}$, $A^{23}$, and $A^{24}$ each are any one independently selected from halogen or a structural formula represented by Formula (III-B), Formula (III-C), or Formula (III-D):

(III-B)

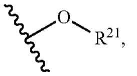

(III-C)

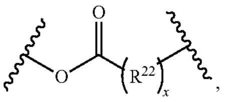

, and (III-D)

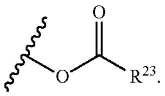

x is selected from 0 or 1. $R^{21}$ and $R^{23}$ each are independently selected from a substituted or unsubstituted $C_1$ to $C_6$ alkyl or a substituted or unsubstituted $C_2$ to $C_6$ alkenyl, in which a substituent for substitution is halogen. $R^{22}$ is selected from a substituted or unsubstituted $C_1$ to $C_6$ alkylidene or a substituted or unsubstituted $C_2$ to $C_6$ alkenylene, in which a substituent for substitution is halogen. When $A^{21}$, $A^{22}$, $A^{23}$, and $A^{24}$ are selected from the structural formulas represented by Formula (III-C), 2 or 4 of $A^{21}$, $A^{22}$, $A^{23}$, or $A^{24}$ are independently selected from the structural formulas represented by Formula (III-C) concurrently. Every two structural formulas represented by Formula (III-C) can bond with each other to form a cyclic structure. An O atom adjacent to

in Formula (III-C) is connected to a B atom at the center of Formula (III-A).

represents a site of bonding with an adjacent atom.

When both the first additive and the third additive are added into the electrolytic solution, the high-temperature storage performance of the electrochemical device can be further improved.

In some embodiments, the compounds represented by Formula (III-A) include at least one of compounds represented by Formula (III-1) to Formula (III-12):

(III-1)

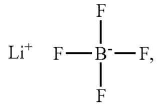

(III-2)

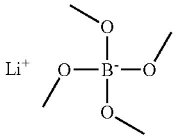

, (III-3)

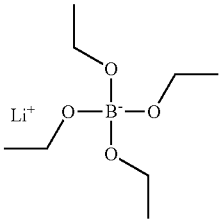

, (III-4)

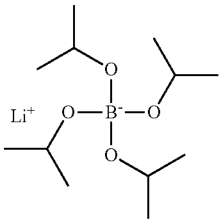

, (III-5)

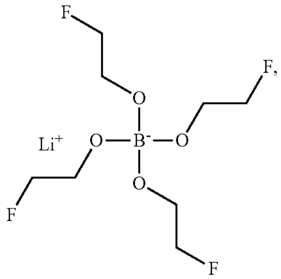

(III-6)

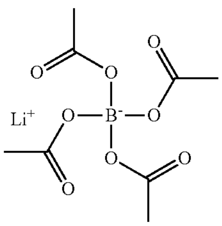

,

-continued (III-7)

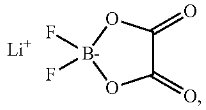, (III-8)

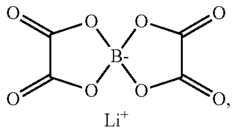, (III-9)

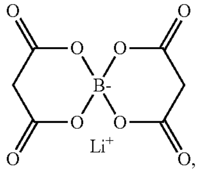, (III-10)

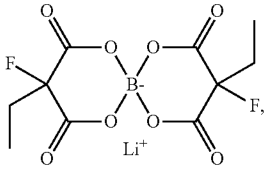, (III-11)

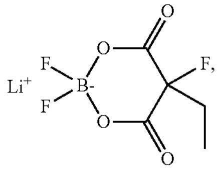, and (III-12)

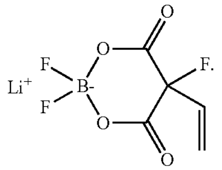.

In some embodiments, the compounds represented by Formula (III-A) include at least one of lithium tetrafluoroborate or lithium difluoro(oxalate)borate. The lithium tetrafluoroborate or lithium difluoro(oxalate)borate can form a fluorine-containing solid electrolyte interface (SEI) film on the surface of the negative electrode and, when being used together with the first additive, can further improve the high-temperature storage performance of the electrochemical device.

In some embodiments, based on the mass of the electrolytic solution, the weight percent of the compound represented by Formula (III-A) is 0.1% to 1%. In some embodiments, based on the mass of the electrolytic solution, the weight percent of the compound represented by Formula (III-A) is 0.2% to 0.5%.

[Fourth Additive]

In some embodiments, the electrolytic solution further includes a fourth additive. The fourth additive includes a compound containing a sulfur-oxygen double bond. The compound containing a sulfur-oxygen double bond includes at least one of compounds represented by Formula (IV-A) or Formula (IV-B):

(IV-A)

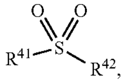, and (IV-B)

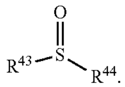.

In Formula (IV-A) and Formula (IV-B), $R^{41}$, $R^{42}$, $R^{43}$, and $R^{44}$ each are independently selected from a substituted or unsubstituted $C_1$ to $C_5$ alkyl, a substituted or unsubstituted $C_2$ to $C_{10}$ alkenyl, a substituted or unsubstituted $C_2$ to $C_{10}$ alkynyl, a substituted or unsubstituted $C_3$ to $C_{10}$ alicyclic hydrocarbyl, a substituted or unsubstituted $C_6$ to $C_{10}$ aryl, or a substituted or unsubstituted $C_1$ to $C_6$ heterocyclic group, in which a substituent for substitution includes at least one of halogen or a heteroatom-containing functional group. $R^{41}$ and $R^{42}$ are able to be bonded to form a cyclic structure, and $R^{43}$ and $R^{44}$ are able to be bonded to form a cyclic structure.

When both the first additive and the fourth additive are added into the electrolytic solution, the high-temperature storage performance and overcharge performance of the electrochemical device can be further improved. On the one hand, the compound represented by Formula (IV-A) or Formula (IV-B) is resistant to oxidation and is not prone to oxidation in a positive electrode material. On the other hand, in a case of lithium plating on the negative electrode, the compound represented by Formula (IV-A) or Formula (IV-B) is reduced on the surface of metallic lithium and forms a protection film to suppress the decomposition and heat emission of the metallic lithium and electrolytic solution, and to further enhance protection for an active material. Therefore, when being used together with the compound represented by Formula (I-A), the foregoing compound can further improve the high-temperature storage performance and overcharge performance of the electrochemical device.

In some embodiments, the compound containing a sulfur-oxygen double bond includes at least one of compounds represented by Formula (IV-1) to Formula (IV-16):

(IV-1)

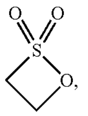, (IV-2)

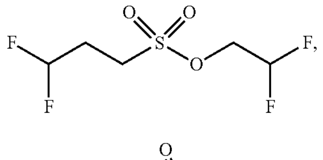, (IV-3)

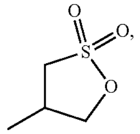, (IV-4)

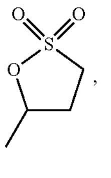,

-continued (IV-5)

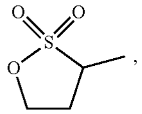

(IV-6)

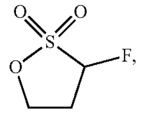

(IV-7)

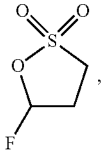

(IV-8)

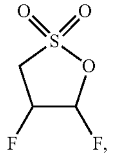

(IV-9)

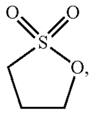

(IV-10)

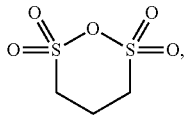

(IV-11)

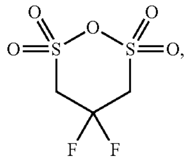

(IV-13)

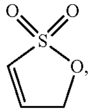

(IV-14)

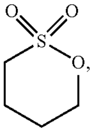

(IV-15)

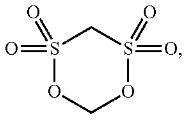

and (IV-16)

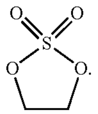

In some embodiments, based on the mass of the electrolytic solution, the weight percent of the compound containing a sulfur-oxygen double bond is 0.01% to 10%. When the weight percent of the compound containing a sulfur-oxygen double bond falls within the foregoing range, the high-temperature storage performance and overcharge performance of the electrochemical device can be further improved. If the weight percent of the compound containing a sulfur-oxygen double bond is too high, viscosity of the electrolytic solution will be too high, and may exert an impact on kinetic performance of the electrochemical device. If the weight percent of the compound containing a sulfur-oxygen double bond is too low, the corresponding performance will be overridden by other ingredients, and the effect of this compound may be weak. In some embodiments, based on the mass of the electrolytic solution, the weight percent of the compound containing a sulfur-oxygen double bond is 1% to 10%. In some embodiments, based on the mass of the electrolytic solution, the weight percent of the compound containing a sulfur-oxygen double bond is 3% to 10%. In some embodiments, based on the mass of the electrolytic solution, the weight percent of the compound containing a sulfur-oxygen double bond is 3% to 5%.

[Fifth Additive]

In some embodiments, the electrolytic solution further includes a fifth additive. The fifth additive includes a lithium phosphate compound. The lithium phosphate compound includes at least one of lithium difluorophosphate ($LiPO2F_2$), lithium difluorobisoxalate phosphate (LiDFOP), or lithium tetrafluorooxalate phosphate (LiTFOP).

When both the first additive and the fifth additive are added into the electrolytic solution, the high-temperature storage performance, cycle performance, and overcharge performance of the electrochemical device can be further improved.

In some embodiments, based on the mass of the electrolytic solution, the weight percent of the lithium phosphate compound is 0.1% to 1%. In some embodiments, based on the mass of the electrolytic solution, the weight percent of the lithium phosphate compound is 0.3% to 0.5%. In some embodiments, based on the mass of the electrolytic solution, the weight percent of the lithium phosphate compound is 0.5% to 1%.

[Sixth Additive]

In some embodiments, the electrolytic solution further includes a sixth additive. The sixth additive includes a cyclic carbonate compound. The cyclic carbonate compound includes a compound represented by Formula (V-A):

(V-A)

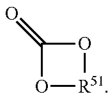

In Formula (V-A), $R^{51}$ is selected from a substituted or unsubstituted $C_1$ to $C_6$ alkylidene or a substituted or unsubstituted $C_2$ to $C_6$ alkenylene, in which a substituent for substitution is selected from halogen, $C_1$ to $C_6$ alkyl, or $C_2$ to $C_6$ alkenyl.

When both the first additive and the sixth additive are added into the electrolytic solution, the additives help to further enhance stability of an SEI film. The compound represented by Formula (V-A) increases flexibility of the SEI film, further enhances protection for the active material, and reduces a probability of contact between the active material and an electrolytic solution interface, thereby suppressing impedance growth caused by accumulation of by-products during cycles.

In some embodiments, the compounds represented by Formula (V-A) include at least one of compounds represented by Formula (V-1) to Formula (V-8):

(V-1)

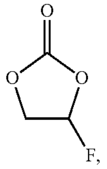

(V-2)

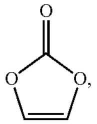

(V-3)

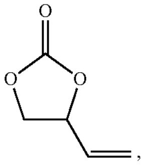

(V-4)

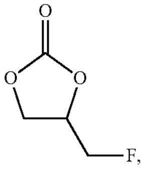

(V-5)

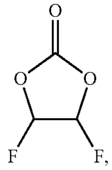

(V-6)

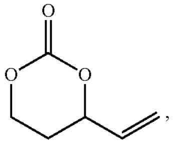

(V-7)

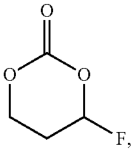

and (V-8)

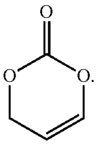

In some embodiments, based on the mass of the electrolytic solution, the weight percent of the compound represented by Formula (V-A) is 0.01% to 30%. In some embodiments, based on the mass of the electrolytic solution, the weight percent of the compound represented by Formula (V-A) is 0.1% to 10%. If a dosage of the additive is too large, the high-temperature performance will be affected. If the dosage of the additive is too small, the effect of the additive will be insignificant.

[Organic Solvent]

In some embodiments, the electrolytic solution further includes an organic solvent. The organic solvent is an organic solvent applicable to an electrochemical device as well known in the art. For example, a nonaqueous organic solvent is usually used.

In some embodiments, the nonaqueous organic solvent is a carbonate solvent, a carboxylate solvent, an ether solvent, a sulfone solvent, or other aprotic solvents.

In some embodiments, the carbonate nonaqueous organic solvent includes at least one of dimethyl carbonate, diethyl carbonate, ethyl methyl carbonate, methyl propyl carbonate, ethylene propyl carbonate, dipropyl carbonate, ethylene carbonate, propylene carbonate, or butylene carbonate.

In some embodiments, the carboxylate nonaqueous organic solvent includes at least one of the compounds represented by Formula (VI-A).

Formula (VI-A)

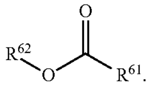

In Formula (VI-A), $R^{61}$ is selected from hydrogen, a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution is halogen.

$R^{62}$ is selected from a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution is halogen. $R^{61}$ and $R^{62}$ are able to be bonded to form a cyclic structure.

In some embodiments, the compounds represented by Formula (VI-A) include at least one of compounds represented by Formula (VI-1) to Formula (VI-77):

(VI-1)

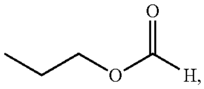

(VI-2)

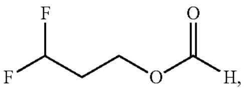

(VI-3)

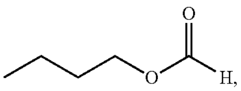

(VI-4)

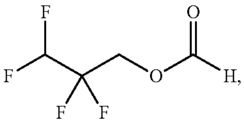

(VI-5)

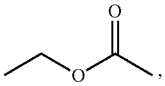

-continued
(VI-6)
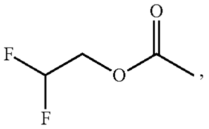
(VI-7)
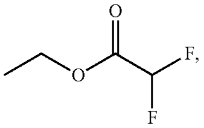
(VI-8)
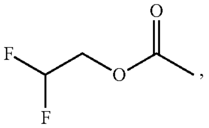
(VI-9)
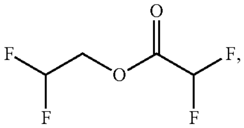
(VI-10)
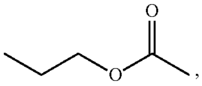
(VI-11)
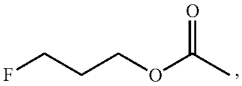
(VI-12)
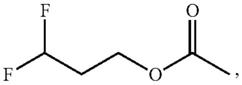
(VI-13)
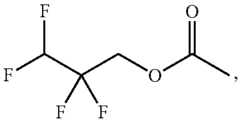
(VI-14)
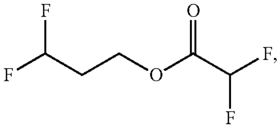
(VI-15)
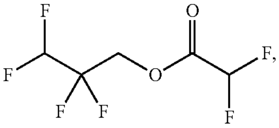
(VI-16)
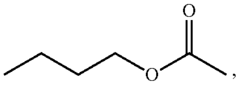
(VI-17)
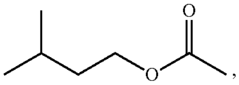
(VI-18)
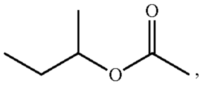
-continued
(VI-19)
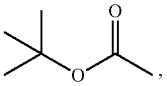
(VI-20)
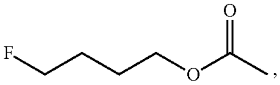
(VI-21)
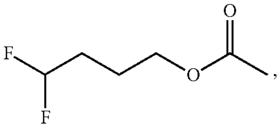
(VI-22)
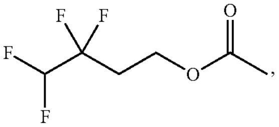
(VI-23)
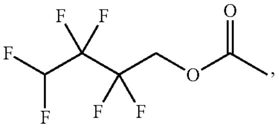
(VI-24)
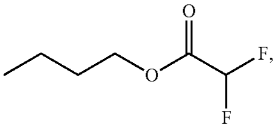
(VI-25)
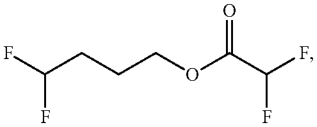
(VI-26)
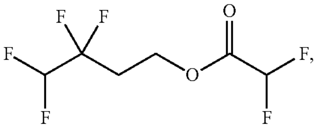
(VI-27)
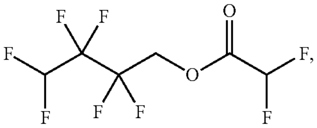
(VI-28)
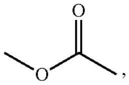
(VI-29)
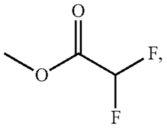
(VI-30)
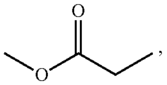
(VI-31)
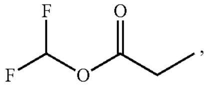

-continued
(VI-32)
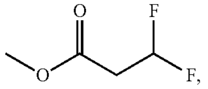
(VI-33)
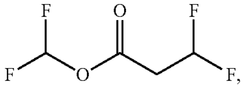
(VI-34)
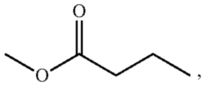
(VI-35)
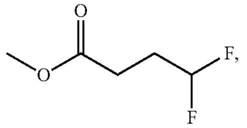
(VI-36)
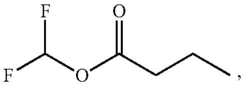
(VI-37)
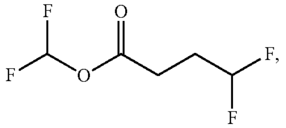
(VI-38)
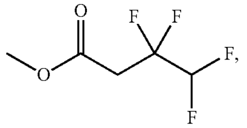
(VI-39)
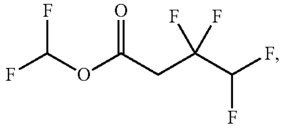
(VI-40)
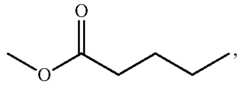
(VI-41)
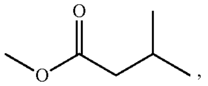
(VI-42)
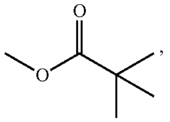
(VI-43)
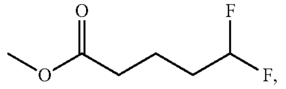
(VI-44)
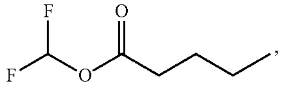
(VI-45)
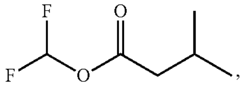
-continued
(VI-46)
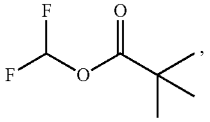
(VI-47)
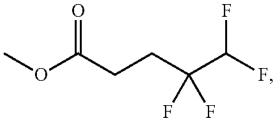
(VI-48)
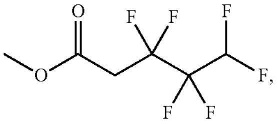
(VI-49)
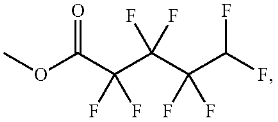
(VI-50)
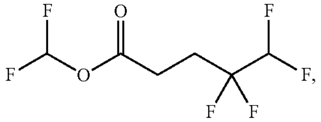
(VI-51)
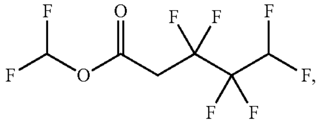
(VI-52)
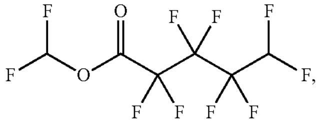
(VI--53)
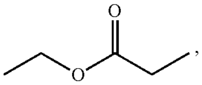
(VI-54)
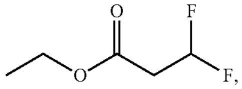
(VI-55)
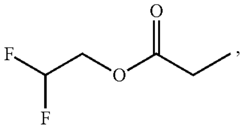
(VI-56)
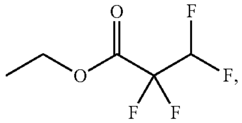
(VI-57)
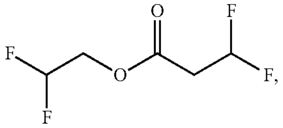

-continued (VI-58)

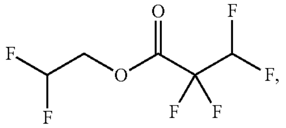

(VI-59)

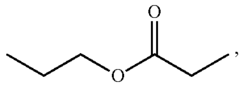

(VI-60)

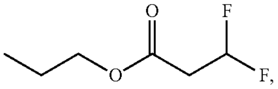

(VI-61)

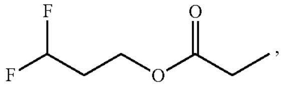

(VI-62)

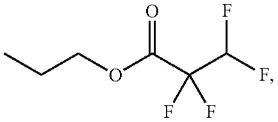

(VI-63)

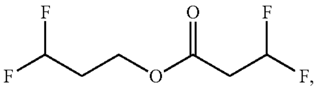

(VI-64)

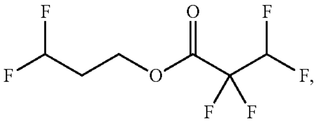

(VI-65)

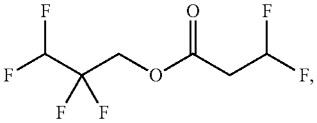

(VI-66)

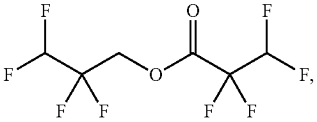

(VI-67)

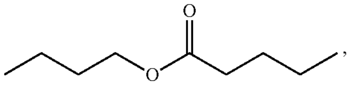

(VI-68)

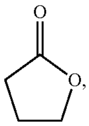

(VI-69)

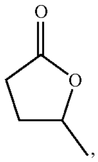

-continued (VI-70)

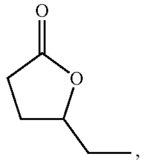

(VI-71)

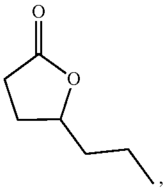

(VI-72)

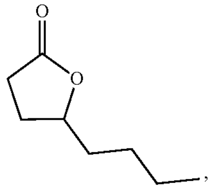

(VI-73)

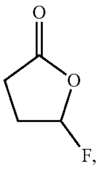

(VI-74)

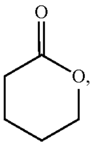

(VI-75)

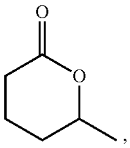

(VI-76)

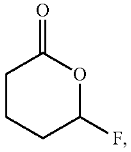

and (VI-77)

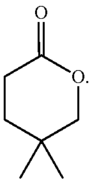

In some embodiments, the ether nonaqueous organic solvent includes at least one of ethylene glycol dimethyl ether, diethylene glycol dimethyl ether, tetraethylene glycol dimethyl ether, dibutyl ether, tetrahydrofuran, or 2-methyl-tetrahydrofuran.

In some embodiments, the sulfone nonaqueous organic solvent includes at least one of ethyl vinyl sulfone, methyl isopropyl sulfone, isopropyl sec-butyl sulfone, or sulfolane.

The nonaqueous organic solvent may be used alone or added in a mixture. When the nonaqueous organic solvent is added in a mixture, a mixing ratio of the mixture may be controlled based on desired performance of the electrochemical device.

[Electrolyte Salt]

In some embodiments, the electrolytic solution further includes an electrolyte salt. The electrolyte salt is an electrolyte salt applicable to an electrochemical device as well known in the art. An appropriate electrolyte salt may be selected for each different electrochemical device. For example, for a lithium-ion battery, the electrolyte salt is usually a lithium salt.

In some embodiments, the lithium salt includes at least one of an organic lithium salt or an inorganic lithium salt.

In some embodiments, the lithium salt includes at least one of a fluorine-containing lithium salt, a boron-containing lithium salt, or a phosphorus-containing lithium salt.

In some embodiments, the lithium salt includes at least one of lithium hexafluorophosphate ($LiPF_6$), lithium hexafluoroantimonate ($LiSbF_6$), lithium perfluorobutyl sulfonate ($LiC_4F_9SO_3$), lithium perchlorate ($LiClO_4$), lithium aluminate ($LiAlO_2$), lithium tetrachloroaluminate ($LiAlCl_4$), or lithium bissulfonimide ($LiN(C_xF_{2x+1}SO_2)(C_yF_{2y+1}SO_2)$) (in which x and y are natural numbers), lithium chloride (LiCl), or lithium fluoride (LiF).

In some embodiments, the lithium salt includes lithium hexafluorophosphate ($LiPF_6$).

In some embodiments, based on a volume of the electrolytic solution, a molar concentration of lithium in the lithium salt is 0.5 to 3 mol/L. In some embodiments, based on the volume of the electrolytic solution, the molar concentration of lithium in the lithium salt is 0.5 to 2 mol/L. In some embodiments, based on the volume of the electrolytic solution, the molar concentration of lithium in the lithium salt is 0.8 to 1.5 mol/L.

(Electrochemical Device)

The electrochemical device according to this application is, for example, a primary battery, a secondary battery, a fuel battery, a solar battery, or a capacitor. The secondary battery is, for example, a lithium secondary battery. The lithium secondary battery includes but is not limited to a lithium metal secondary battery, a lithium-ion secondary battery, a lithium polymer secondary battery, or a lithium-ion polymer secondary battery.

In some embodiments, the electrochemical device includes a positive electrode plate, a negative electrode plate, a separator, and the electrolytic solution described herein above.

[Positive Electrode Plate]

The positive electrode plate is a positive electrode plate applicable to an electrochemical device as well known in the art. In some embodiments, the positive electrode plate includes a positive current collector and a positive active material layer. The positive active material layer is disposed on a surface of the positive current collector. The positive active material layer contains a positive active material.

In some embodiments, the structure of the positive electrode plate is a positive electrode plate structure applicable to an electrochemical device as well known in the art.

In some embodiments, the positive current collector is a metal. The metal may be, but is not limited to, an aluminum foil.

The positive active material may be one of various positive active materials applicable to an electrochemical device as well known in the art, and is a conventional well-known material capable of reversibly intercalating and deintercalating active ions.

In some embodiments, the positive active material includes at least one of composite oxides of lithium and a metal, where the metal is cobalt, manganese, nickel, or any combination thereof.

In some embodiments, the positive active material includes at least one of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiMn_2O_4LiNi_{1-y}Co_yO_2$, $LiCo_{1-y}MnO_2$, $LiNi_{1-y}Mn_yO_2$ ($0<y<1$), $Li(Ni_aMn_bCo_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $Li(Ni_aCo_bAl_c)O_2$ ($0<a<1$, $0<b<1$, $0<c<1$, $a+b+c=1$), $LiCoPO_4$, or $LiFePO_4$.

In some embodiments, the positive active material includes at least one of sulfide, selenide, and halide.

In some embodiments, the positive active material contains a coating layer, and the coating layer overlays the surface of the positive active material. In some embodiments, the positive active material is mixed with a positive active material coated with a coating layer. In some embodiments, a coating element compound in the coating layer includes at least one of oxide of the coating element, hydroxide of the coating element, oxyhydroxide of the coating element, oxycarbonate (oxycarbonate) of the coating element, or alkaline carbonate of the coating element. In some embodiments, the coating element compound in the coating layer is in a non-crystalline form or a crystalline form. In some embodiments, the coating element in the coating layer includes Mg, Al, Co, K, Na, Ca, Si, Ti, V, Sn, Ge, Ga, B, As, Zr, or a mixture thereof. By using the coating element in the coating element compound, the coating layer can be formed by any means that does not adversely affect the properties of the positive active material. The coating layer may be formed by any means well known in the art, including but not limited to spraying and infiltration.

In some embodiments, the positive active material layer further includes a binder and a conductive material. The binder is a binder applicable to a positive active material layer as well known in the art. In some embodiments, the binder includes at least one of polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene difluoride, polyethylene, polypropylene, styrene-butadiene rubber, acrylic styrene-butadiene rubber, epoxy resin, or nylon. The binder is configured to improve the binding performance between different positive active material particles, and between a positive active material particle and the current collector. The conductive material is a conductive material applicable to a positive active material layer as well known in the art. In some embodiments, the conductive material includes at least one of natural graphite, artificial graphite, carbon black, acetylene black, Ketjen black, carbon fiber, metal powder, metal fiber, or conductive slurry (also known as conductive adhesive tape). In some embodiments, the metal powder includes metal powder of at least one of copper, nickel, aluminum, or silver. In some embodiments, the metal fiber includes metal fiber of at least one of copper, nickel, aluminum, or silver. The conductive material is configured to enable conductivity of the electrode.

In some embodiments, the structure of the positive electrode plate is a positive electrode plate structure applicable to an electrochemical device as well known in the art.

In some embodiments, a method for preparing the positive electrode plate is a positive electrode plate preparation method applicable to an electrochemical device as well known in the art. In some embodiments, in preparing a positive slurry, a solvent is usually added. After a binder, and as appropriate, a conductive material and a thickener, are added as positive active materials, the positive active materials are dissolved or dispersed in the solvent to make a positive slurry. The solvent is removed by volatilizing during the drying. The solvent is a solvent applicable to a positive active material layer as well known in the art. The solvent may be, but is not limited to, N-methyl-pyrrolidone (NMP).

A compacted density of the positive electrode plate is not particularly limited in this application, and may be adjusted according to actual needs.

[Negative Electrode Plate]

The negative electrode plate is a negative electrode plate applicable to an electrochemical device as well known in the art. In some embodiments, the negative electrode plate includes a negative current collector and a negative active material layer. The negative active material layer is disposed on a surface of the negative current collector. The negative active material layer contains a negative active material.

In some embodiments, a structure of the negative electrode plate is a negative electrode plate structure applicable to an electrochemical device as well known in the art.

In some embodiments, the negative current collector is metal, including but not limited to: a copper foil, a nickel foil, a stainless steel foil, a titanium foil, foamed nickel, foamed copper, or a polymer substrate clad with a conductive metal.

The negative active material may be one of various negative active materials applicable to an electrochemical device as well known in the art, and is a conventional well-known material that enables reversible intercalation and deintercalation of active ions or enables reversible doping of active ions and removal of dopants.

In some embodiments, the negative active material contains at least one of lithium metal, lithium metal alloy, or carbon material. In some embodiments, the lithium metal alloy contains an alloy of lithium and a metal selected from Na, K, Rb, Cs, Fr, Be, Mg, Ca, Sr, Si, Sb, Pb, In, Zn, Ba, Ra, Ge, Al, or Sn. The carbon material may be one of various carbon materials suitable for use as a carbon-based negative active material of an electrochemical device as well known in the art. In some embodiments, the carbon material includes at least one of crystalline carbon or non-crystalline carbon. In some embodiments, the crystalline carbon is natural graphite or artificial graphite. In some embodiments, the crystalline carbon may be amorphous, plate-shaped, mini-flake-shaped, spherical or fiber-shaped. In some embodiments, the crystalline carbon is low-crystallinity carbon or high-crystallinity carbon. In some embodiments, the low-crystallinity carbon includes at least one of soft carbon or hard carbon. In some embodiments, the high-crystallinity carbon includes at least one of natural graphite, crystalline graphite, pyrolytic carbon, mesophase pitch-based carbon fiber, mesophase carbon microbeads, mesophase pitch, or high-temperature calcined carbon. In some embodiments, the high-temperature calcined carbon is petroleum, or is coke derived from coal tar pitch. In some embodiments, the non-crystalline carbon includes at least one of soft carbon, hard carbon, mesophase pitch carbonization product, or fired coke. In some embodiments, the negative active material includes a transition metal oxide. In some embodiments, the transition metal oxide includes at least one of vanadium oxide or lithium vanadium oxide. In some embodiments, the negative active material includes at least one of Si, $SiO_x$ ($0<x<2$), Si/C composite, Si-Q alloy, Sn, $SnO_z$, Sn—C composite, or Sn—R alloy, where Q is at least one selected from alkali metal, alkaline earth metal, group-13 to group-16 elements, transition element, or rare earth element, and Q is not Si. R is at least one selected from alkali metal, alkaline earth metal, group-13 to group-16 elements, transition element, or rare earth element, and R is not Sn. In some embodiments, Q and R each include at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn Cd, B, Al, Ga, Sn, In, Tl, Ge, P, As, Sb, Bi, S, Se, Te, or Po. In some embodiments, $SiO_x$ ($0<x<2$) is a porous negative active material. In some embodiments, an average particle diameter (D50) of the $SiO_x$ particles is 1 to 20 μm. In some embodiments, as measured on the surface, an average diameter of pores in $SiO_x$ particles is 30 to 500 nm. In some embodiments, a specific surface area of the $SiO_x$ particles is 5 to 50 $m^2/g$. In some embodiments, the negative active material includes $SiO_x$ ($0<x<2$) and is at least one selected from $Li_2SiO_3$ and $Li_4SiO_4$. In some embodiments, in the Si/C composite, carbon (C) is not dispersed inside an Si particle after agglomerating in blocks, but is evenly dispersed inside the Si particle in an atomic state. In some embodiments, in the Si/C composite, a molar ratio of C to Si satisfies: $0<C/Si<18$. In some embodiments, based on a total mass of the Si/C composite, a weight percent of C is 1 wt % to 50 wt %. In some embodiments, the average particle diameter of the Si/C composite particles is 10 to 100 μm.

In some embodiments, the negative active material layer further includes a binder. The binder is a binder applicable to a negative active material layer as well known in the art. In some embodiments, the binder is any binder polymer, and may be but is not limited to, polyvinylidene difluoride-hexafluoropropylene copolymer (PVDF-co-HFP), polyvinylidene difluoride, polyacrylonitrile, polymethyl methacrylate, polyvinyl alcohol, carboxymethyl cellulose, hydroxypropyl cellulose, polyvinyl chloride, carboxylated polyvinyl chloride, polyvinyl fluoride, ethylene-oxide-containing polymer, polyvinylpyrrolidone, polyurethane, polytetrafluoroethylene, polyethylene, polypropylene, styrene-butadiene rubber, acrylic styrene-butadiene rubber, epoxy resin, or nylon. The binder is configured to improve the binding performance between different negative active material particles, and between a negative active material particle and a negative current collector.

In some embodiments, the negative active material layer further includes a conductive material. The conductive material is a conductive material applicable to a negative active material layer as well known in the art. In some embodiments, the conductive material is a conductive material that does not cause chemical changes, and may be, but is not limited to, carbon-based material, metal-based material, or conductive polymer. The carbon-based material may be, but is not limited to, natural graphite, artificial graphite, carbon black, acetylene black, Ketjen black, or carbon fiber. The metal-based material may be, but is not limited to, copper, nickel, aluminum, silver, and other metal powder or metal fiber. The conductive polymer may be, but is not limited to, polyphenylene derivative. The conductive material is configured to improve conductivity of the negative electrode plate.

In some embodiments, a structure of the negative electrode plate is a negative electrode plate structure applicable to an electrochemical device as well known in the art.

In some embodiments, a method for preparing the negative electrode plate is a negative electrode plate preparation method applicable to an electrochemical device as well known in the art. In some embodiments, in preparing a negative slurry, a solvent is usually added. After a binder, and as appropriate, a conductive material and a thickener are added as negative active materials, the negative active materials are dissolved or dispersed in the solvent to make a negative slurry. The solvent is removed by volatilizing during the drying. The solvent is a solvent applicable to a negative active material layer as well known in the art. The solvent may be, but is not limited to, water. The thickener is a thickener applicable to a negative active material layer as well known in the art. The thickener may be, but is not limited to, sodium carboxymethyl cellulose.

A compacted density of the negative electrode plate is not particularly limited in this application, and may be adjusted according to actual needs.

[Separator]

The separator is a separator applicable to an electrochemical device as well known in the art. The separator may be, but is not limited to, polyolefin-based microporous film. In some embodiments, the separator is at least one selected from polyethylene (PE), ethylene-propylene copolymer, polypropylene (PP), ethylene-butene copolymer, ethylene-hexene copolymer, or ethylene-methyl methacrylate copolymer.

In some embodiments, the separator is a single-layer separator or a multi-layer separator.

In some embodiments, the polyolefin-based microporous film is coated with a coating layer. In some embodiments, the coating layer includes an organic coating layer and an inorganic coating layer. The organic coating is at least one selected from polyvinylidene difluoride, vinylidene difluoride-hexafluoropropylene copolymer, polyacrylonitrile, polyimide, acrylonitrile-butadiene copolymer, acrylonitrile-styrene-butadiene copolymer, polymethyl methacrylate, polymethyl acrylate, polyethyl acrylate, acrylate-styrene copolymer, polydimethylsiloxane, sodium polyacrylate, or sodium carboxymethyl cellulose. The inorganic coating layer is at least one selected from $SiO_2$, $Al_2O_3$, CaO, $TiO_2$, $ZnO_2$, MgO, $ZrO_2$, and $SnO_2$.

The form and thickness of the separator are not particularly limited in this application. The method for preparing the separator is a separator preparation method applicable to an electrochemical device as well known in the art.

[Outer Packaging Shell]

In some embodiments, the electrochemical device further includes an outer packaging shell. The outer packaging shell is an outer packaging shell applicable to an electrochemical device and stable to the electrolytic solution in use as well known in the art, and may be, but is not limited to a metallic outer packaging shell.

(Electronic Device)

The electronic device according to this application is any electronic device, and may be, for example, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, and a lithium-ion capacitor. It needs to be noted that the electrochemical device according to this application is not only applicable to the electronic devices enumerated above, but also applicable to energy storage stations, marine transport vehicles, and air transport vehicles. The air transport vehicles include air transport vehicles in the atmosphere and air transport vehicles outside the atmosphere.

In some embodiments, the electronic device includes the electrochemical device described herein above.

This application is further described below with reference to embodiments. Understandably, the embodiments are merely intended to illustrate this application but not intended to limit the scope of this application.

Unless otherwise expressly specified, reagents, materials, and instruments used in the following embodiments and comparative embodiments are all commercially available or obtained by synthesis.

Reagents specifically used in the electrolytic solution are as follows:

Additives:

First additives: 3,3',3'',3''',3''''-(pentane-1,2,3,4,5-pentaylpentakis(oxy))pentapropanenitrile (I-2), 3,3',3'',3''',3''''-(heptane-1,2,3,5,7-pentaylpentakis(oxy))pentapropanenitrile (I-4), 3,3',3'',3''',3'''',3'''''-(hexane-1,2,3,4,5,6-hexaylhexakis(oxy))hexapropanenitrile (I-7), 1,4-bis(1,2,3-tris(β-cyanoethoxy)propyl)benzene (I-10), 3,3',3'',3''',3'''',3''''',3''''''-(heptane-1,2,3,4,5,6,7-heptaylheptakis(oxy)) heptapropanenitrile (I-11), 3,3',3'',3''',3'''',3''''',3'''''',3'''''''-(octan-1,2,3,4,5,6,7,8-octayloctakis(oxy))octapropanenitrile (I-12), 5,6,7-tris(2-cyanoethoxy)undecanedinitrile (I-15), 3,3'-((2-(1,5-bis(2-cyanoethoxy)-2,4-bis((2-cyanoethoxy) methyl)pentan-3-yl)propane-1,3-diyl)bis(oxy))dipropanenitrile (I-16), 5-(2-cyanoethoxy)-4,6-bis(2-cyanoethyl) nonanedinitrile (I-18), and 4,4,6,6-tetrakis((2-cyanoethoxy) methyl)nonanedinitrile (I-20):

(I-2)

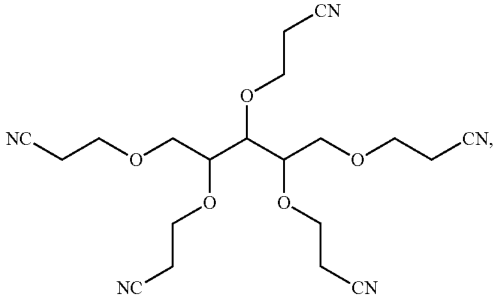

(I-4)

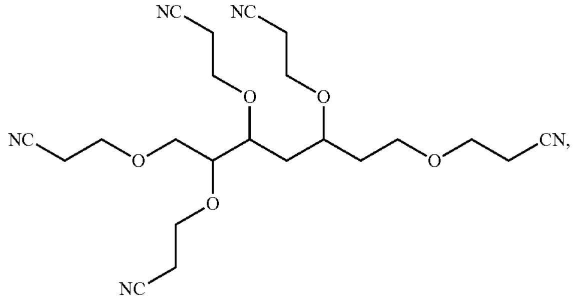

-continued
(I-7)
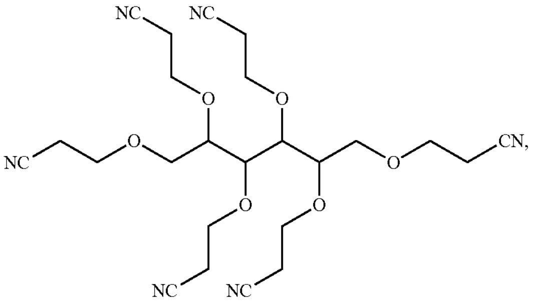
(I-10)
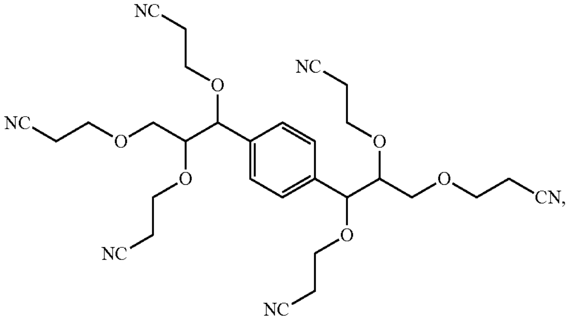
(I-11)
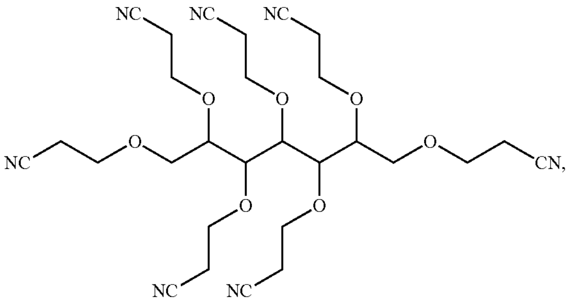
(I-12)
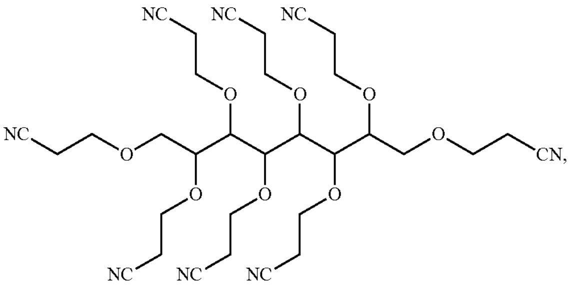
(I-15)
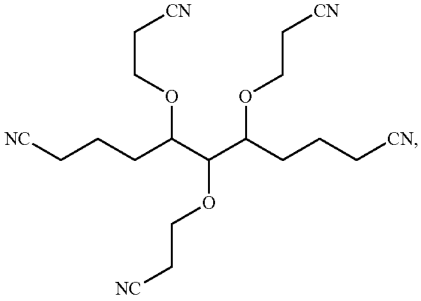
-continued
(I-16)
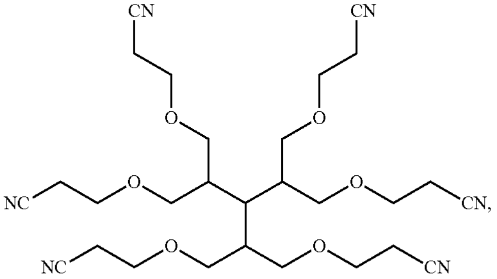
(I-18)
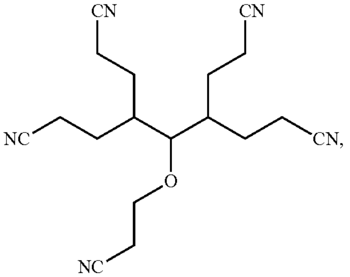
and
(I-20)
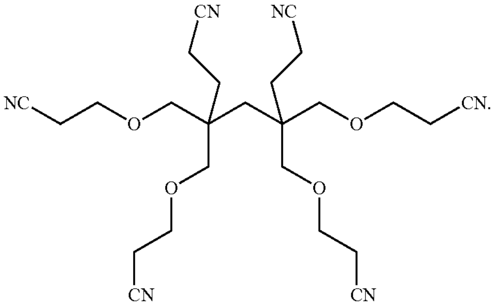
Second additives: adiponitrile (II-3), 1,2-bis(2-cyanoethoxy)ethane (II-8), 1,3,6-hexane tricarbonitrile (II-11), and 1,2,3-tris(2-cyanoethoxy)propane (II-12):
(II-3)
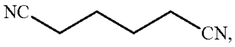
(II-8)
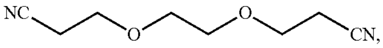
(II-11)
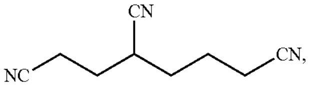
and
(II-12)
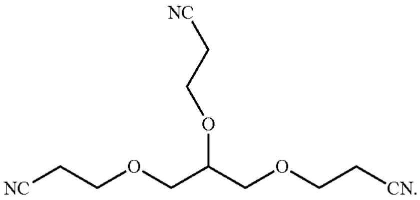
Third additives: lithium tetrafluoroborate (I-1), and lithium PGP-difluoro(oxalate)borate (III-7):

(III-1)

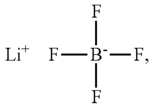

and (III-7)

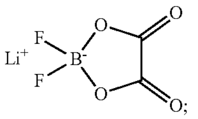

Fourth additives: 2,4-butane sultone (Formula IV-5), 1,3-propane sultone (IV-9), and ethylene sulfate (IV-16):

(IV-5)

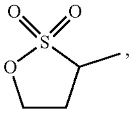

(IV-9)

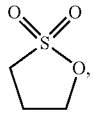

and (IV-16)

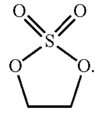

Fifth additives: lithium difluorophosphate ($LiPO_2F_2$), and lithium tetrafluorooxalate phosphate (LiTFOP).

The compound represented by Formula (I-A) in this application is commercially available, or may be synthesized by using a conventional preparation method well known in the art, or may be synthesized by using the following preparation method. Using the compound represented by Formula (I-2) as an example, specific synthesis steps are as follows:

Mixing xylitol (3.04 g, 20 mmol) and acrylonitrile (10.5 mL, 8.48, 160 mmol)) in a 50 mL round-bottom flask. Cooling the mixture in an ice bath while adding tetramethylammonium hydroxide (TMAH, 25 wt % water solution, 0.25 mL 0.254 g, 7 mmol). Heating the mixture slowly until the temperature of the mixture reaches a room temperature, keeping stirring the mixture for 48 hours, and, after 24 hours, adding another portion of TMAH (0.25 mL). After a reaction time, performing column chromatography purification through silicon oxide by using a mixture of methanol and dichloromethane (1:40), and evaporating a filtrate under a reduced pressure to obtain a colorless oily, completely cyanoethylated product (5.42, 65%). $^1H$ NMR (400 MHz, $CD_3CN$, ppm): δ 3.82-3.89 (m, 3H), 3.59-3.74 (m, 12H), 2.63 (q, J=4.8 Hz, 10 Hz). $^{13}C$ NMR (400 MHz, $CD_3CN$, ppm): δ 133.8, 119.6, 119.5, 119.3, 79.8, 79.3, 70.6, 68.0, 66.4, 66.2, 19.4, 19.3, and 18.9.

Compounds represented by Formula (I-1) and Formula (I-3) to Formula (I-20) may be obtained through synthesis, and the synthesis method is similar to the method for synthesizing the compound represented by Formula (I-2) except that the reactant is adjusted.

Lithium-ion batteries in Embodiments 1 to 138 and Comparative Embodiments 1 to 7 are prepared according to the following method:

(1) Preparing an Electrolytic Solution

In an argon atmosphere glovebox in which the water content is less than 10 ppm, mixing ethylene carbonate (EC for short), propylene carbonate (PC for short), diethyl carbonate (DEC for short), ethyl propionate (EP for short), propyl propionate (PP for short) evenly at a mass ratio of 1:1:1:1:1, dissolving thoroughly dried lithium salt $LiPF_6$ (1 M) in the foregoing nonaqueous solvent, and adding additives in a given weight percent to prepare the electrolytic solution.

(2) Preparing a Positive Electrode Plate

Stirring and mixing lithium cobalt oxide (LCO) (molecular formula: $LiCoO_2$) as a positive active material, conductive carbon black, conductive slurry, and polyvinylidene difluoride (PVDF for short) as a binder in an appropriate amount of N-methyl-pyrrolidone (NMP for short) solvent thoroughly at a mass ratio of 97.9:0.4:0.5:1.2 to form a homogeneous positive slurry, coating an aluminum foil as a positive current collector with the slurry, and performing drying, cold calendering, and tab welding to obtain a positive electrode plate, where a compacted density of the positive electrode is 4.15 $g/cm^3$.

(3) Preparing a Separator

Using a single-layer PE porous polymer film as a separator (S), where the thickness of the film is 5 microns, a porosity is 45%, an inorganic coating layer is $Al_2O_3$, and organic particles are polyvinylidene difluoride.

(4) Preparing a Negative Electrode Plate

Stirring and mixing graphite as a negative active material, styrene butadiene rubber (SBR for short) as a binder, and sodium carboxymethyl cellulose (CMC for short) as a thickener in an appropriate amount of deionized water solvent thoroughly at a mass ratio of 97.4:1.4:1.2 to form a homogeneous negative shiny, coating a copper foil as a negative current collector with the slurry, and performing drying and cold calendering to obtain a negative electrode plate, where a compacted density of the negative electrode is 1.78 $g/cm^3$.

(5) Preparing a Lithium-Ion Battery

Stacking the positive electrode plate, the separator, and the negative electrode plate sequentially, letting the separator be located between the positive electrode plate and the negative electrode plate to serve a separation function, winding the plates to obtain a bare cell, placing the bare cell into an outer package foil, injecting the prepared electrolytic solution into the cell that is dried, and performing steps such as vacuum packaging, standing, chemical formation, and shaping to complete preparing the lithium-ion battery.

The lithium-ion batteries in Embodiments 1 to 136 and Comparative Embodiments 1 to 7 are tested according to the following method:

85° C. high-temperature storage test: Charging the battery at a constant current of 0.5 C at a temperature of 25° C. until a voltage of 4.45 V, then charging the battery at a constant voltage until a current of 0.05 C, and measuring the thickness of the lithium-ion battery and recording the thickness as $d_0$; placing the battery into an 85° C. oven to stay for 24 hours, and measuring the thickness at this time and recording the thickness as d. Thickness expansion rate of the lithium-ion battery after high-temperature storage for 24 hours (%)=$(d-d_0)/d_0 \times 100\%$. The test stops when the thickness expansion rate exceeds 50%.

Cycle test: Charging the battery at a current of 0.7 C at a temperature of 25° C. until a voltage of 4.45 V, and charging the battery at a constant voltage of 4.45 V until a current of 0.05 C. Then discharging the battery at a current of 1 C until a voltage of 3.0 V, and measuring the thickness of the lithium-ion battery and recording the thickness as $d_0$; and repeating the process of charging at 0.7 C and discharging at 1 C for 700 cycles. In the first 200 cycles, measuring the thickness of the lithium-ion battery every 50 cycles. After the first 200 cycles, measuring the thickness every 100 cycles, and recording the thickness as d. Calculating the cycle expansion rate according to the following formula: expansion rate (%)=$(d-d_0)/d_0 \times 100\%$.

Floating charge test: Discharging the battery at a current of 0.5 C at a temperature of 25° C. until a voltage of 3.0 V, then charging the battery at a current of 0.5 C until a voltage of 4.45 V, and charging the battery at a constant voltage of 4.45 V until a current of 0.05 C, and measuring the thickness of the lithium-ion battery and recording the thickness as do; placing the battery into an 45° C. oven; charging the battery at a constant voltage of 4.45 V for 42 days, monitoring the thickness change, measuring the thickness every three days, and recording the thickness as d. Thickness expansion rate under floating charge of the lithium-ion battery (%)=$(d-d_0)/d_0\times100\%$. The test stops when the thickness expansion rate exceeds 50%.

The types and content of additives used in Embodiments 1 to 138 and Comparative Embodiments 1 to 7 as well as the performance test results are shown in Table 1 to Table 4. The content of each additive is a weight percent calculated based on the mass of the electrolytic solution.

TABLE 1

Electrolytic solutions and performance test results in Embodiments 1 to 48 and Comparative Embodiments 1 to 2

| | First additive | | Second additive II-3 | II-8 | II-11 | II-12 | | Thickness expansion rate after | Thickness expansion rate after floating | Capacity retention rate after 800 cycles |
|---|---|---|---|---|---|---|---|---|---|---|
| Serial number | Type | Content (wt %) | Content (wt%) | Content (wt %) | Content (wt %) | Content (wt %) | a/b | high-temperature storage at 85° C. | charge at 45° C. | undergone at 25° C. |
| Comparative Embodiment 1 | — | — | — | — | — | — | — | 48.60% | Greater than 100% | Not up to |
| Comparative Embodiment 2 | — | — | 2 | 1 | — | — | — | 36.60% | Greater than 100% | 70.20% |
| Embodiment 1 | I-15 | 0.1 | — | — | — | — | — | 29.60% | 47.30% | 69.20% |
| Embodiment 2 | I-15 | 0.3 | — | — | — | — | — | 25.90% | 42.50% | 71.90% |
| Embodiment 3 | I-15 | 0.5 | — | — | — | — | — | 22.70% | 36.20% | 75.20% |
| Embodiment 4 | I-15 | 1 | — | — | — | — | — | 20.30% | 26.10% | 77.50% |
| Embodiment 5 | I-15 | 2 | — | — | — | — | — | 17.10% | 15.60% | 78.20% |
| Embodiment 6 | I-15 | 5 | — | — | — | — | — | 15.50% | 10.90% | 75.90% |
| Embodiment 7 | I-15 | 7 | — | — | — | — | — | 13.60% | 9.70% | 74.50% |
| Embodiment 8 | I-4 | 1 | — | — | — | — | — | 20.90% | 27.30% | 78.40% |
| Embodiment 9 | I-10 | 1 | — | — | — | — | — | 20.50% | 27.10% | 79.20% |
| Embodiment 10 | I-11 | 1 | — | — | — | — | — | 21.20% | 27.60% | 77.20% |
| Embodiment 11 | I-12 | 1 | — | — | — | — | — | 22.50% | 28.30% | 76.60% |
| Embodiment 12 | I-16 | 1 | — | — | — | — | — | 20.10% | 25.20% | 78.60% |
| Embodiment 13 | I-18 | 1 | — | — | — | — | — | 19.20% | 25.60% | 76.10% |
| Embodiment 14 | I-20 | 1 | — | — | — | — | — | 18.70% | 24.90% | 77.80% |
| Embodiment 15 | I-15 | 1 | 1 | — | — | — | 1.00 | 19.30% | 21.30% | 78.50% |
| Embodiment 16 | I-15 | 1 | 2 | — | — | — | 0.50 | 17.60% | 18.70% | 81.70% |
| Embodiment 17 | I-15 | 1 | 2 | 1 | — | — | 0.33 | 15.20% | 11.80% | 84.60% |
| Embodiment 18 | I-15 | 1 | 2 | 1 | — | 0.5 | 0.29 | 14.00% | 10.10% | 85.30% |
| Embodiment 19 | I-16 | 1 | 2 | 1 | — | — | 0.33 | 14.80% | 10.70% | 86.60% |
| Embodiment 20 | I-18 | 1 | 2 | 1 | — | — | 0.33 | 14.20% | 11.40% | 84.00% |
| Embodiment 21 | I-20 | 1 | 2 | 1 | — | — | 0.33 | 13.90% | 11.20% | 85.40% |
| Embodiment 22 | I-2 | 0.1 | 2 | 1 | — | — | 0.03 | 23.50% | 46.50% | 72.30% |
| Embodiment 23 | I-2 | 0.3 | 2 | 1 | — | — | 0.10 | 21.30% | 32.70% | 80.70% |
| Embodiment 24 | I-2 | 0.5 | 2 | 1 | — | — | 0.17 | 19.70% | 20.30% | 83.20% |
| Embodiment 25 | I-2 | 1 | 2 | 1 | — | — | 0.33 | 16.20% | 13.00% | 85.70% |
| Embodiment 26 | I-2 | 2 | 2 | 1 | — | — | 0.67 | 13.10% | 9.80% | 87.90% |
| Embodiment 27 | I-2 | 5 | 2 | 1 | — | — | 1.67 | 10.50% | 9.50% | 79.10% |
| Embodiment 28 | I-2 | 1 | 1 | 2 | 1 | — | 0.33 | 17.10% | 15.60% | 86.50% |
| Embodiment 29 | I-2 | 1 | 2.5 | 0.5 | — | — | 0.33 | 15.50% | 12.40% | 86.00% |
| Embodiment 30 | I-2 | 1 | 2 | 1 | 0.5 | — | 0.29 | 14.80% | 11.50% | 86.90% |
| Embodiment 31 | I-2 | 1 | 2 | 1 | — | 0.5 | 0.29 | 15.20% | 11.20% | 87.20% |
| Embodiment 32 | I-2 | 1 | 4 | 1 | — | — | 0.20 | 15.40% | 11.80% | 87.00% |
| Embodiment 33 | I-2 | 1 | 6.5 | 3 | — | 0.5 | 0.10 | 13.80% | 9.80% | 75.70% |
| Embodiment 34 | I-2 | 1 | 2 | — | — | — | 0.50 | 18.50% | 16.00% | 84.90% |
| Embodiment 35 | I-2 | 1 | 2 | — | 1 | — | 0.33 | 13.80% | 10.50% | 88.60% |
| Embodiment 36 | I-2 | 1 | 2 | — | — | 1 | 0.33 | 14.20% | 10.20% | 88.90% |
| Embodiment 37 | I-2 | 1 | 2 | — | 1.5 | — | 0.22 | 11.70% | 7.30% | 88.10% |
| Embodiment 38 | I-2 | 1 | 3 | 1 | 1.5 | — | 0.18 | 11.20% | 7.00% | 87.70% |
| Embodiment 39 | I-4 | 1 | 2 | 1 | — | — | 0.33 | 15.90% | 12.30% | 86.20% |
| Embodiment 40 | I-4 | 1 | 2 | 1 | 0.5 | — | 0.29 | 14.80% | 10.50% | 87,60% |
| Embodiment 41 | I-4 | 1 | 2 | 1 | — | 0.5 | 0.29 | 15.00% | 11.00% | 87.30% |
| Embodiment 42 | I-7 | 1 | 2 | 1 | — | — | 0.33 | 15.60% | 12.70% | 86.50% |
| Embodiment 43 | I-7 | 1 | 2 | 1 | 0.5 | — | 0.29 | 14.50% | 10.20% | 87.30% |
| Embodiment 44 | I-10 | 1 | 2 | 1 | 0.5 | — | 0.29 | 14.20% | 9.90% | 87.60% |
| Embodiment 45 | I-11 | 1 | 2 | 1 | — | — | 0.33 | 16.50% | 13.20% | 85.40% |
| Embodiment 46 | I-11 | 1 | 2 | 1 | 0.5 | — | 0.29 | 15.10% | 12.20% | 86.20% |
| Embodiment 47 | I-12 | 1 | 2 | 1 | — | — | 0.33 | 17.10% | 14.50% | 85.00% |
| Embodiment 48 | I-12 | 1 | 2 | 1 | 0.5 | — | 0.29 | 15.70% | 12.90% | 85.90% |

Note: a/b is a mass ratio of the compound represented by Formula (I-A) to the compound represented by Formula (II-A).

Note: "Not up to" means that "Not up to" means that the battery in the corresponding embodiment cannot reach 800 cycles at 25° C. ..

Analysis of the data in Table 1 shows that:

The compound represented by Formula (I-A), which is added into the lithium-ion battery, can significantly improve the high-temperature storage performance, cycle performance, and floating charge performance of the lithium-ion battery. Possible reasons are: The compound represented by Formula (I-A) contains a functional group, and the functional group can stabilize the transition metal on the surface of the positive active material and decrease oxidation of the high-valence transition metal, and can oxidize on the surface of the electrode plate to form a film to provide double protection for the electrode plate. This can suppress decomposition of the electrolytic solution, and suppress high-temperature gassing. In addition, the number of —CN functional groups in the compound represented by Formula (I-A) is 5 to 10. On the one hand, the large number of cyano groups makes it easy to reduce into a film, and brings a better protection effect. On the other hand, a plurality of cyano groups can be synchronously attached onto the protection film on the surface of the positive electrode while the functional groups are oxidized into films on the surface of the electrode plate. In this case, a plurality of cyano groups work together and coordinate with the transition metal to exert a stronger acting force to achieve a better protection effect. Surplus cyano groups can adsorb free transition metal ions, thereby further enhancing stability of the electrolytic solution system.

When the compound represented by Formula (II-A) is further added into the electrolytic solution that already contains the compound represented by Formula (I-A), the high-temperature storage performance, floating charge performance, and cycle performance of the lithium-ion batteries can be further improved concurrently. When the compound represented by Formula (I-A) is used together with the compound represented by Formula (II-A), performance can be balanced, the impact caused by the solubility and viscosity of the electrolytic solution can be mitigated, and cost can be reduced. The data in Embodiments 22 to 27 shows that when the mass ratio of the compound represented by Formula (I-A) to the compound represented by Formula (II-A) falls within an appropriate range, the overall performance of the lithium-ion battery is well balanced.

TABLE 2

Electrolytic solutions and performance test results in Embodiment 4, Embodiments 49 to 79 and Comparative Embodiments 3 to 4

| | First additive | | Second additive | | | | Third additive | | Thickness expansion |
|---|---|---|---|---|---|---|---|---|---|
| | | | II-3 | II-8 | I-11 | II-12 | III-1 | III-7 | rate after |
| Serial number | Type | Content (wt %) | Content (wt %) | Content (wt %) | Content (wt %) | Content (wt %) | Content (wt %) | Content (wt %) | high-temperature storage at 85 ° C. |
| Comparative Embodiment 3 | — | — | — | — | — | — | 0.2 | — | Greater than 50% |
| Comparative Embodiment 4 | — | — | — | — | — | — | — | 0.5 | Greater than 50% |
| Embodiment 4 | I-15 | 1 | — | — | — | — | — | — | 20.30% |
| Embodiment 49 | I-15 | 1 | — | — | — | — | 0.1 | — | 18.80% |
| Embodiment 50 | I-15 | 1 | — | — | — | — | 0.2 | — | 18.10% |
| Embodiment 51 | I-15 | 1 | — | — | — | — | 0.5 | — | 18.50% |
| Embodiment 52 | I-15 | 1 | — | — | — | — | — | 0.1 | 19.30% |
| Embodiment 53 | I-15 | 1 | — | — | — | — | — | 0.3 | 18.20% |
| Embodiment 54 | I-15 | 1 | — | — | — | — | — | 0.5 | 17.10% |
| Embodiment 55 | I-15 | 1 | — | — | — | — | — | 1 | 19.00% |
| Embodiment 56 | I-4 | 1 | — | — | — | — | 0.2 | — | 18.80% |
| Embodiment 57 | I-11 | 1 | — | — | — | — | 0.2 | — | 19.30% |
| Embodiment 58 | I-12 | 1 | — | — | — | — | 0.2 | — | 20.80% |
| Embodiment 59 | I-16 | 1 | — | — | — | — | 0.2 | — | 17.80% |
| Embodiment 60 | I-18 | 1 | — | — | — | — | 0.2 | — | 16.70% |
| Embodiment 61 | I-20 | 1 | — | — | — | — | 0.2 | — | 16.30% |
| Embodiment 62 | I-4 | 1 | — | — | — | — | — | 0.5 | 17.90% |
| Embodiment 63 | I-11 | 1 | — | — | — | — | — | 0.5 | 18.40% |
| Embodiment 64 | I-12 | 1 | — | — | — | — | — | 0.5 | 20.40% |
| Embodiment 65 | I-16 | 1 | — | — | — | — | — | 0.5 | 16.90% |
| Embodiment 66 | I-18 | 1 | — | — | — | — | — | 0.5 | 15.60% |
| Embodiment 67 | I-20 | 1 | — | — | — | — | — | 0.5 | 15.40% |
| Embodiment 68 | I-2 | 1 | — | 1 | — | — | 0.2 | — | 17.90% |
| Embodiment 69 | I-2 | 1 | 2 | — | — | — | — | 0.5 | 17.10% |
| Embodiment 70 | I-2 | 1 | 2 | 1 | 0.5 | — | — | 0.5 | 12.70% |
| Embodiment 71 | I-2 | 1 | 2 | 1 | — | 0.5 | — | 0.5 | 13.00% |
| Embodiment 72 | I-4 | 1 | 2 | 1 | — | — | 0.2 | — | 14.00% |
| Embodiment 73 | I-4 | 1 | 2 | 1 | — | 0.5 | 0.2 | — | 12:50% |
| Embodiment 74 | I-7 | 1 | 2 | 1 | — | — | — | 0.5 | 13.20% |
| Embodiment 75 | I-7 | 1 | 2 | 1 | 0.5 | — | 0.2 | — | 12.40% |
| Embodiment 76 | I-11 | 1 | 2 | 1 | — | — | 0.2 | — | 14.10% |
| Embodiment 77 | I-11 | 1 | 2 | 1 | 0.5 | — | — | 0.5 | 13.00% |
| Embodiment 78 | I-12 | 1 | 2 | 1 | — | — | 0.2 | — | 14.40% |
| Embodiment 79 | I-12 | 1 | 2 | 1 | — | 0.5 | — | 0.5 | 13.50% |

Analysis of the data in Table 2 shows that when the compound represented by Formula (II-A) is further added into the electrolytic solution that already contains the compound represented by Formula (I-A), the 85° C. high-temperature storage performance of the lithium-ion batteries can be further improved; and, when the compound represented by Formula (II-A) and the compound represented by Formula (III-A) are further added into the electrolytic solution that already contains the compound represented by Formula (I-A), the 85° C. high-temperature storage performance of the lithium-ion batteries can be further improved.

TABLE 3

Electrolytic solutions and performance test results in Embodiment 4, Embodiments 80 to 110 and Comparative Embodiment 5

| | First additive | | Second additive | | | | Fourth additive | | | Thickness expansion rate after high-temperature storage at 85° C. |
|---|---|---|---|---|---|---|---|---|---|---|
| | | | II-3 | II-8 | II-11 | II-12 | IV-5 | IV-9 | IV-16 | |
| Serial number | Type | Content (wt %) | Content (wt %) | Content (wt %) | Content (wt %) | Content (wt %) | Content (wt %) | Content (wt %) | Content (wt %) | |
| Comparative Embodimem 5 | — | — | — | — | — | — | — | 3 | 0.5 | 26.50% |
| Embodiment 4 | I-15 | 1 | — | — | — | — | — | — | | 20.30% |
| Embodiment 80 | I-15 | 1 | — | — | — | — | 0.1 | — | — | 19.70% |
| Embodiment 81 | I-15 | 1 | — | — | — | — | 1 | — | — | 17.00% |
| Embodiment 82 | I-15 | 1 | — | — | — | — | 2 | 1 | — | 15.80% |
| Embodiment 83 | I-15 | 1 | — | — | — | — | 2 | — | 0.5 | 16.20% |
| Embodiment 84 | I-15 | 1 | — | — | — | — | 2 | 1 | 0.5 | 15.20% |
| Embodiment 85 | I-15 | 1 | — | — | — | — | — | 1 | — | 13.80% |
| Embodiment 86 | I-15 | 1 | — | — | — | — | 6 | 2 | 1 | 10.60% |
| Embodiment 87 | I-16 | 1 | — | — | — | — | 2 | — | 0.5 | 15.80% |
| Embodiment 88 | I-18 | 1 | — | — | — | — | 2 | — | 0.5 | 15.00% |
| Embodiment 89 | I-20 | 1 | — | — | — | — | 2 | — | 0.5 | 14.40% |
| Embodiment 90 | I-15 | 1 | 2 | 1 | — | — | 2 | — | 0.5 | 15.00% |
| Embodiment 91 | I-16 | 1 | 2 | 1 | — | — | 2 | — | 0.5 | 14.80% |
| Embodiment 92 | I-18 | 1 | 2 | 1 | — | — | 2 | — | 0.5 | 14.00% |
| Embodiment 93 | I-20 | 1 | 2 | 1 | — | — | 2 | — | 0.5 | 13.50% |
| Embodiment 94 | I-15 | 1 | 2 | — | — | 0.5 | 2 | — | 0.5 | 14.20% |
| Embodiment 95 | I-16 | 1 | 2 | — | 4 | 0.5 | 2 | — | 0.5 | 13.50% |
| Embodiment 96 | I-18 | 1 | 2 | — | — | 0.5 | 2 | — | 0.5 | 13.20% |
| Embodiment 97 | I-20 | 1 | 2 | — | — | 0.5 | 2 | — | 0.5 | 12.90% |
| Embodiment 98 | I-2 | 1 | 2 | 1 | — | — | 2 | — | — | 15.50% |
| Embodiment 99 | I-2 | 1 | 2 | 1 | 5 | — | 3 | — | 0.5 | 14.70% |
| Embodiment 100 | I-2 | 1 | 2 | 1 | — | — | 4 | — | 0.5 | 14.20% |
| Embodiment 101 | I-2 | 1 | 2 | 1 | — | — | 4 | — | 1 | 13.50% |
| Embodiment 102 | I-2 | 1 | 2 | 1 | — | — | 3 | 1 | 0.5 | 13.20% |
| Embodiment 103 | I-2 | 1 | 2 | 1 | — | — | 2 | 2 | 0.5 | 13.30% |
| Embodiment 104 | I-2 | 1 | 2 | 1 | — | — | — | 3 | 0.5 | 14.50% |
| Embodiment 105 | I-2 | 1 | 2 | 1 | 0.5 | — | — | 3 | 0.5 | 12.70% |
| Embodiment 106 | I-2 | 1 | 2 | 1 | — | 0.5 | — | 3 | 0.5 | 13.10% |
| Embodiment 107 | I-4 | 1 | 2 | 1 | — | — | — | 3 | 0.5 | 14.00% |
| Embodiment 108 | I-7 | 1 | 2 | 1 | — | — | — | 3 | 0.5 | 13.50% |
| Embodiment 109 | I-11 | 1 | 2 | 1 | — | — | — | 3 | 0.5 | 14.90% |
| Embodiment 110 | I-12 | 1 | 2 | 1 | — | — | — | 3 | 0.5 | 15.20% |

Analysis of the data in Table 3 shows that when the compound containing a sulfur-oxygen double bond according to this application is further added into the electrolytic solution that already contains the compound represented by Formula (I-A), the 85° C. high-temperature storage performance of the lithium-ion batteries can be further improved; and, when the compound represented by Formula (II-A) and the compound containing a sulfur-oxygen double bond according to this application are further added into the electrolytic solution that already contains the compound represented by Formula (I-A), the 85° C. high-temperature storage performance of the lithium-ion batteries can be further improved.

TABLE 4

Electrolytic solutions and performance test results in Embodiment 4, Embodiments 111 to 138 and Comparative Embodiments 6 to 7

| | First additive | | Second additive | | | Fifth additive | | Thickness expansion rate after high-temperature storage at 85° C. | Capacity retention rate after 800 cycles undergone at 25° C. |
|---|---|---|---|---|---|---|---|---|---|
| | | | II-3 | II-8 | II-12 | $LiPO_2F_2$ | LiTFOP | | |
| Serial number | Type | Content (wt %) | Content (wt %) | Content (wt %) | Content (wt %) | Content (wt %) | Content (wt %) | | |
| Comparative Embodiment 6 | — | — | — | — | — | 0.3 | — | Greater than 50% | 58.20% |
| Comparative Embodiment 7 | — | — | — | — | — | — | 0.5 | Greater than 50% | 50.90% |
| Embodiment 4 | I-15 | 1 | — | — | — | — | — | 20.30% | 77.50% |
| Embodiment 111 | I-15 | 1 | — | — | — | 0.1 | — | 18.20% | 80.20% |
| Embodiment 112 | I-15 | 1 | — | — | — | 0.3 | — | 17.00% | 83.60% |
| Embodiment 113 | I-15 | 1 | — | — | — | 0.5 | — | 15.80% | 82.20% |
| Embodiment 114 | I-15 | 1 | — | — | — | 0.9 | — | 14.20% | 78.90% |
| Embodiment 115 | I-15 | 1 | — | — | — | — | 0.1 | 19.00% | 79.40% |
| Embodiment 116 | I-15 | 1 | — | — | — | — | 0.3 | 17.80% | 80.50% |

TABLE 4-continued

Electrolytic solutions and performance test results in Embodiment 4, Embodiments 111 to 138 and Comparative Embodiments 6 to 7

| | First additive | | Second additive | | | Fifth additive | | Thickness expansion | Capacity retention |
|---|---|---|---|---|---|---|---|---|---|
| | | | II-3 | II-8 | II-12 | $LiPO_2F_2$ | LiTFOP | rate after | rate after 800 |
| Serial number | Type | Content (wt %) | Content (wt %) | Content (wt %) | Content (wt %) | Content (wt %) | Content (wt %) | high-temperature storage at 85° C. | cycles undergone at 25° C. |
| Embodiment 117 | I-15 | 1 | — | — | — | — | 0.5 | 16.30% | 82.60% |
| Embodiment 118 | I-15 | 1 | — | — | — | — | 1 | 15.70% | 80.00% |
| Embodiment 119 | I-4 | 1 | — | — | — | 0.3 | — | 17.70% | 84.30% |
| Embodiment 120 | I-11 | 1 | — | — | — | 0.3 | — | 18.20% | 83.40% |
| Embodiment 121 | I-12 | 1 | — | — | — | 0.3 | — | 19.10% | 82.90% |
| Embodiment 122 | I-16 | 1 | — | — | — | 0.3 | — | 16.90% | 84.30% |
| Embodiment 123 | I-18 | 1 | — | — | — | 0.3 | — | 16.30% | 81.70% |
| Embodiment 124 | I-20 | 1 | — | — | — | 0.3 | — | 15.90% | 83.80% |
| Embodiment 125 | I-4 | 1 | — | — | — | — | 0.5 | 16.80% | 83.20% |
| Embodiment 126 | I-11 | 1 | — | — | — | — | 0.5 | 17.40% | 82.50% |
| Embodiment 127 | I-12 | 1 | — | — | — | — | 0.5 | 18.50% | 81.80% |
| Embodiment 128 | I-16 | 1 | — | — | — | — | 0.5 | 16.30% | 83.40% |
| Embodiment 129 | I-18 | 1 | — | — | — | — | 0.5 | 15.50% | 80.50% |
| Embodiment 130 | I-20 | | — | — | — | — | 0.5 | 15.20% | 82.90% |
| Embodiment 131 | I-15 | 1 | 2 | 1 | — | 0.3 | | 14.20% | 85.70% |
| Embodiment 132 | I-15 | 1 | 2 | 1 | — | — | 0.5 | 13.80% | 85.20% |
| Embodiment 133 | I-2 | 1 | — | 1 | — | 0.3 | — | 17.20% | 84.30% |
| Embodiment 134 | I-2 | 1 | 2 | — | — | — | 0.5 | 16.00% | 86.10% |
| Embodiment 135 | I-2 | 1 | 2 | 1 | — | — | 0.5 | 15.00% | 87,60% |
| Embodiment 136 | I-2 | 1 | 2 | 1 | 0.5 | — | 0.5 | 13.90% | 87.20% |
| Embodiment 137 | I-7 | 1 | 2 | 1 | — | — | 0.5 | 14.30% | 87.90% |
| Embodiment 138 | I-7 | 1 | 2 | 1 | — | 0.3 | — | 14.60% | 88.30% |

Analysis of the data in Table 4 shows that when the lithium phosphate compound according to this application is further added into the electrolytic solution that already contains the compound represented by Formula (I-A), the high-temperature storage performance and cycle performance of the lithium-ion batteries can be further improved; and, when the compound represented by Formula (II-A) and the lithium phosphate compound according to this application are further added into the electrolytic solution that already contains the compound represented by Formula (I-A), the high-temperature storage performance and cycle performance of the lithium-ion batteries can be further improved.

Lithium-ion batteries in Embodiments 139 to 159 and Comparative Embodiment 8 are prepared according to the following method:

(1) Preparing an Electrolytic Solution

Mixing ethylene carbonate (EC for short), propylene carbonate (PC for short), diethyl carbonate (DEC for short), and ethyl propionate (EP for short) evenly at a mass ratio of 1:2:6:1 in an argon atmosphere glovebox in which the water content is less than 10 ppm, and dissolving thoroughly dried lithium salt $LiPF_6$ (1 M) in the foregoing mixture. Finally, adding additives in a given weight percent to prepare the electrolytic solution.

(2) Preparing a Positive Electrode Plate

Stirring and mixing lithium cobalt oxide (LCO) (molecular formula: $LiCoO_2$) as a positive active material, conductive carbon black, conductive slurry, and polyvinylidene difluoride (PVDF for short) as a binder in an appropriate amount of N-methyl-pyrrolidone (NMP for short) solvent thoroughly at a mass ratio of 97.9:0.4:0.5:1.2 to form a homogeneous positive slurry, coating an aluminum foil as a positive current collector with the slurry, and performing drying, cold calendering, and tab welding to obtain a positive electrode plate, where a compacted density of the positive electrode is 4.15 g/cm$^3$.

(3) Preparing a Separator

Using a single-layer PE porous polymer film as a separator (S), where the thickness of the film is 5 microns, a porosity is 45%, an inorganic coating layer is $Al_2O_3$, and organic particles are polyvinylidene difluoride.

(4) Preparing a Negative Electrode Plate

Stirring and mixing graphite as a negative active material, silicon material ($SiO_x$, $0<x<2$), sodium carboxymethyl cellulose (CMC for short) as a thickener, and modified polyacrylic acid in an appropriate amount of deionized water thoroughly at a mass ratio of 87.3:9.7:0.6:2.4 to form a homogeneous negative slurry, coating a copper foil as a negative current collector with the slurry, and performing drying and cold calendering to obtain a second negative electrode, where a compacted density of the second negative electrode is 1.76 g/cm$^3$.

(5) Preparing a Lithium-Ion Battery

Stacking the positive electrode plate, the separator, and the negative electrode plate sequentially, letting the separator be located between the positive electrode plate and the negative electrode plate to serve a separation function, winding the plates to obtain a bare cell, placing the bare cell into an outer package foil, injecting the prepared electrolytic solution into the cell that is dried, and performing steps such as vacuum packaging, standing, chemical formation, and shaping to complete preparing the lithium-ion battery.

The lithium-ion batteries in Embodiments 139 to 159 and Comparative Embodiment 8 are tested according to the following method:

85° C. high-temperature storage test: Charging the battery at a constant current of 0.5 C at a temperature of 25° C. until a voltage of 4.45 V, then charging the battery at a constant voltage until a current of 0.05 C, and measuring the thickness of the lithium-ion battery and recording the thickness as $d_0$; placing the battery into an 85° C. oven to stay for 24 hours, and measuring the thickness at this time and recording the thickness as d. Thickness expansion rate of the lithium-ion battery after high-temperature storage for 24 hours (%)=$(d-d_0)/d_0 \times 100\%$. The test stops when the thickness expansion rate exceeds 50%.

The types and content of additives used in Embodiments 139 to 159 and Comparative Embodiment 8 as well as the performance test results are shown in Table 5. The content of each additive is a weight percent calculated based on the mass of the electrolytic solution.

TABLE 5

Electrolytic solutions and performance test results in Embodiments 139 to 159 and Comparative Embodiment 8

| Serial number | First additive Ether polynitrile compound Type | Content (wt %) | Second additive II-3 Content (wt %) | II-8 Content (wt %) | II-12 Content (wt %) | Thickness expansion rate after high-temperature storage at 85° C. |
|---|---|---|---|---|---|---|
| Comparative Embodiment 8 | — | — | 2 | 1 | — | Greater than 50% |
| Embodiment 139 | I-15 | 0.5 | — | — | — | 46.30% |
| Embodiment 140 | I-15 | 1 | — | — | — | 42.30% |
| Embodiment 141 | I-15 | 2 | — | — | — | 32.30% |
| Embodiment 142 | I-16 | 1 | — | — | — | 37.90% |
| Embodiment 143 | I-18 | 1 | — | — | — | 36.20% |
| Embodiment 144 | I-20 | 1 | — | — | — | 34.50% |
| Embodiment 145 | I-15 | 1 | 1 | — | — | 38.20% |
| Embodiment 146 | I-15 | 1 | 2 | — | — | 35.30% |
| Embodiment 147 | I-15 | 1 | — | 1 | — | 37.60% |
| Embodiment 148 | I-15 | 1 | 5 | — | 0.5 | 34.70% |
| Embodiment 149 | I-15 | 1 | 2 | — | 0.5 | 28.90% |
| Embodiment 150 | I-15 | 1 | 2 | 1 | — | 30.90% |
| Embodiment 151 | I-15 | 1 | 2 | 1 | 0.5 | 28.70% |
| Embodiment 152 | I-16 | 1 | 2 | 1 | — | 28.50% |
| Embodiment 153 | I-16 | 1 | — | 1 | 0.5 | 25.70% |
| Embodiment 154 | I-18 | 1 | 2 | 1 | — | 28.20% |
| Embodiment 155 | I-16 | 1 | — | — | 1 | 26.00% |
| Embodiment 156 | I-18 | 1 | — | — | 0.5 | 29.10% |
| Embodiment 157 | I-20 | 1 | — | — | 0.5 | 27.20% |
| Embodiment 158 | I-2 | 1 | — | — | 0.5 | 30.90% |
| Embodiment 159 | I-7 | 1 | — | — | 0.5 | 29.80% |

Analysis of the data in Table 5 shows that, in a silicon system, the compound represented by Formula (I-A) can still significantly improve the high-temperature storage performance of the lithium-ion battery; and, when the compound represented by Formula (II-A) is further added into the electrolytic solution that already contains the compound represented by Formula (I-A), the 85° C. high-temperature storage performance of the lithium-ion batteries can be further improved.

The lithium-ion batteries in Embodiments 160 to 184 and Comparative Embodiments 9 to 11 are prepared according to the following method:

(1) Preparing an Electrolytic Solution

Mixing ethylene carbonate (EC for short), propylene carbonate (PC for short), and diethyl carbonate (DEC for short) evenly at a mass ratio of 3:3:4 in an argon atmosphere glovebox in which the water content is less than 10 ppm, dissolving thoroughly dried lithium salt $LiPF_6$ (1 N) in the foregoing nonaqueous solvent, and finally adding additives in a given weight percent to prepare the electrolytic solution.

(2) Preparing a Positive Electrode Plate

Stirring and mixing a NCM811 (molecular formula: $LiNi_{0.8}Mn_{0.1}Co_{0.1}O_2$) as a positive active material, acetylene black as a conductive agent, and polyvinylidene difluoride (PVDF for short) as a binder in an appropriate amount of N-methyl-pyrrolidone (NMP for short) solvent thoroughly at a mass ratio of 96:2:2 to form a homogeneous positive slurry, coating an aluminum foil as a positive current collector with the slurry, and performing drying and cold calendering to obtain a positive electrode plate, where a compacted density of the positive electrode is 3.50 g/cm$^3$.

(3) Preparing a Separator

Using a single-layer PE porous polymer film as a separator (S), where the thickness of the film is 5 microns, a porosity is 45%, an inorganic coating layer is $Al_2O_3$, and organic particles are polyvinylidene difluoride.

(4) Preparing a Negative Electrode Plate

Stirring and mixing graphite as a negative active material, styrene butadiene rubber (SBR for short) as a binder, and sodium carboxymethyl cellulose (CMC for short) as a thickener in an appropriate amount of deionized water solvent thoroughly at a mass ratio of 97.4:1.4:1.2 to form a homogeneous negative shiny, coating a copper foil as a negative current collector with the slurry, and performing drying and cold calendering to obtain a negative electrode plate, where a compacted density of the negative electrode is 1.78 g/cm$^3$.

(5) Preparing a Lithium-Ion Battery

Stacking the positive electrode plate, the separator, and the negative electrode plate sequentially, letting the separator be located between the positive electrode plate and the negative electrode plate to serve a separation function, winding the plates to obtain a bare cell, placing the bare cell into an outer package foil, injecting the prepared electrolytic solution into the cell that is dried, and performing steps such as vacuum packaging, standing, chemical formation, and shaping to complete preparing the lithium-ion battery.

The lithium-ion batteries in Embodiments 160 to 184 and Comparative Embodiments 9 to 12 are tested according to the following method:

85° C. high-temperature storage test: Charging the battery at a constant current of 0.5 C at a temperature of 25° C. until a voltage of 4.45 V, then charging the battery at a constant voltage until a current of 0.05 C, and measuring the thickness of the lithium-ion battery and recording the thickness as do; placing the battery into an 85° C. oven to stay for 24 hours, and measuring the thickness at this time and recording the thickness as d. Thickness expansion rate of the lithium-ion battery after high-temperature storage for 24 hours (%)=$(d-d_0)/d_0 \times 100\%$. The test stops when the thickness expansion rate exceeds 50%.

Overcharge test: Discharging the battery at a current of 0.5 C and a temperature of 25° C. until a voltage of 2.8 V, then charging the battery at a constant current of 2 C until of a voltage of 7 V (the voltage of the battery in a 100% SOC state is 4.25 V), and finally charging the battery at a constant voltage for 3 hours. Monitoring the temperature change on the surface of the battery cell, and counting the number of battery cells that have passed the test, where the test is passed if no fire or smoke occurs.

The types and content of additives used in Embodiments 160 to 184 and Comparative Embodiments 9 to 11 as well as the performance test results are shown in Table 6. The content of each additive is a weight percent calculated based on the mass of the electrolytic solution.

Analysis of the data in Table 6 shows that, in an NCM system, the compound represented by Formula (I-A) can still significantly improve the high-temperature storage performance of the lithium-ion batteries and improve the overcharge performance; when the compound containing a sulfur-oxygen double bond according to this application is further added into the electrolytic solution that already contains the compound represented by Formula (I-A), the 85° C. high-temperature storage performance and the overcharge performance of the lithium-ion batteries can be further improved; when the lithium phosphate compound according to this application is further added into the electrolytic solution that already contains the compound represented by Formula (I-A), the 85° C. high-temperature storage performance and the overcharge performance of the lithium-ion batteries can be further improved, and, when the compound containing a sulfur-oxygen double bond and the lithium phosphate compound according to this application are further added into the electrolytic solution that already contains the compound represented by Formula (I-A), the 85° C. high-temperature storage performance and the overcharge performance of the lithium-ion batteries can be further improved.

Although a plurality of exemplary embodiments are described above, this disclosure is not limited to the explicitly disclosed combinations. Therefore, unless otherwise specified herein, the features disclosed herein may be combined together variously. For brevity, other various combinations are not described herein.

TABLE 6

Electrolytic solutions and performance test results in Embodiments 160 to 184 and Comparative Embodiments 9 to 11

| | First additive Ether polynitrile compound | | Fourth additive | | | Fifth additive | | Thickness expansion rate after high- | Number of battery cells passing |
|---|---|---|---|---|---|---|---|---|---|
| | | | IV-5 | IV-9 | IV-16 | $LiPO_2F_2$ | LiTFOP | | |
| Serial number | Type | Content (wt %) | Content (wt %) | Content (wt %) | Content (wt %) | Content (wt %) | Content (wt %) | temperature storage at 85° C. | the test after overcharge |
| Comparative Embodiment 9 | — | — | — | — | — | 0.5 | — | 37.70% | 0 |
| Comparative Embodiment 10 | — | — | — | — | — | — | 0.5 | 38.50% | 0 |
| Compamtive Embodiment 11 | — | — | 3 | — | 0.5 | — | — | 36.50% | 0 |
| Embodiment 160 | I-15 | 0.1 | — | — | — | — | — | 35.30% | 0 |
| Embodiment 161 | I-15 | 0.3 | — | — | — | — | — | 33.90% | 2 |
| Embodiment 162 | I-15 | 0.5 | — | — | — | — | — | 30.20% | 3 |
| Embodiment 163 | I-15 | 1 | — | — | — | — | — | 25.30% | 5 |
| Embodiment 164 | I-15 | 3 | — | — | — | — | — | 19.60% | 8 |
| Embodiment 165 | I-15 | 1 | 3 | — | — | — | — | 22.60% | 6 |
| Embodiment 166 | I-15 | 1 | 3 | — | 0.5 | — | — | 20.50% | 8 |
| Embodiment 167 | I-15 | 1 | 2 | 1 | 0.5 | — | — | 19.40% | 8 |
| Embodiment 168 | I-15 | 1 | 1 | 2 | 0.5 | — | — | 18.90% | 8 |
| Embodiment 169 | I-15 | 1 | — | 3 | 1 | — | — | 18.20% | 8 |
| Embodiment 170 | I-2 | 1 | — | — | 0.5 | — | — | 21.30% | 7 |
| Embodiment 171 | I-7 | 1 | 3 | — | 0.5 | — | — | 20.90% | 7 |
| Embodiment 172 | I-15 | 1 | — | — | — | 0.1 | — | 23.90% | 5 |
| Embodiment 173 | I-15 | 1 | — | — | — | 0.5 | — | 20.20% | 6 |
| Embodiment 174 | I-15 | 1 | — | — | — | 1 | — | 15.60% | 7 |
| Embodiment 175 | I-15 | 1 | — | — | — | — | 0.1 | 24.30% | 5 |
| Embodiment 176 | I-15 | 1 | — | — | — | — | 0.5 | 21.50% | 5 |
| Embodiment 177 | I-15 | 1 | — | — | — | — | 1 | 16.90% | 7 |
| Embodiment 178 | I-2 | 1 | — | — | — | 0.5 | — | 23.70% | 6 |
| Embodiment 179 | I-7 | 1 | — | — | — | — | 0.5 | 23.00% | 6 |
| Embodiment 180 | I-15 | 1 | 3 | — | 0.5 | 0.5 | — | 15.20% | 9 |
| Embodiment 181 | I-2 | 1 | 3 | — | 0.5 | 0.5 | — | 15.90% | 9 |
| Embodiment 182 | I-7 | 1 | 3 | — | 0.5 | — | 0.5 | 15.50% | 9 |
| Embodiment 183 | I-15 | 1 | 2 | 1 | 0.5 | 0.5 | — | 14.50% | 10 |
| Embodiment 184 | I-2 | 1 | 2 | 1 | 0.5 | 0.5 | — | 15.00% | 9 |

What is claimed is:

1. An electrolytic solution, comprising at least one of compounds represented by Formula (I-A):

(I-A)

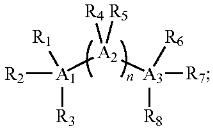

in Formula (I-A), n is an integer selected from 0 to 6;

A1, A2, and A3 each are a structural formula represented by Formula (I-B) or Formula (I-C):

(I-B)

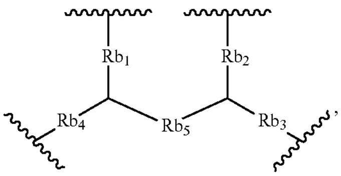

and (I-C)

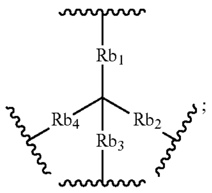

;

$R_1$, $R_2$, $R_3$, $R_4$, $R_5$, $R_6$, $R_7$, and $R_8$ each are independently selected from hydrogen, halogen, a cyano group,

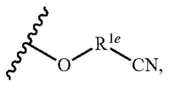

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution comprises at least one of the halogen, the cyano group, or

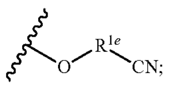

in Formula (I-A), a number of —CN functional groups is 5 to 10, and a number of

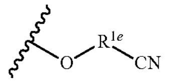

is greater than or equal to 1; and $R_{b1}$, $R_{b2}$, $R_{b3}$, $R_{b4}$, $R_{b5}$, and $R^{1e}$ each are independently selected from a covalent single bond, a substituted or unsubstituted $C_1$ to $C_{10}$ alkylidene, a substituted or unsubstituted $C_2$ to $C_{10}$ alkenylene, a substituted or unsubstituted $C_2$ to $C_{10}$ alkynylene, or a substituted or unsubstituted $C_6$ to $C_{10}$ arylene, in which a substituent for substitution is halogen, wherein

represents a site of bonding with an adjacent atom;

wherein the electrolytic solution further comprises at least one of compounds represented by Formula (II-A):

(II-A)

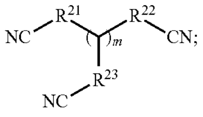

in Formula (II-A), m is selected from 0 or 1;

$R^{21}$, $R^{22}$, and $R^{23}$ each are independently selected from

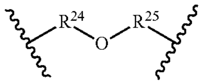

, a substituted or unsubstituted $C_1$ to $C_{10}$ alkylidene or a substituted or unsubstituted $C_2$ to $C_{10}$ alkenylene, in which a substituent for substitution is halogen; and $R^{24}$ and $R^{25}$ each are independently selected from a covalent bond, a substituted or unsubstituted $C_1$ to $C_{10}$ alkylidene, or a substituted or unsubstituted $C_2$ to $C_{10}$ alkenylene, in which a substituent for substitution is halogen, wherein,

represents a site of bonding with an adjacent atom; and wherein the electrolytic solution further comprises at least one of compounds represented by Formula (III-A):

(III-A)

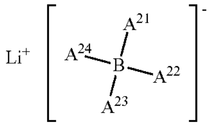

;

in Formula (III-A), $A^{21}$, $A^{22}$, $A^{23}$, and $A^{24}$ each are independently selected from halogen or a structural formula represented by Formula (III-B), Formula (III-C), or Formula (III-D):

(III-B)

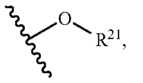

(III-C)

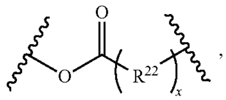

, and (III-D)

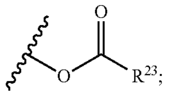

x is selected from 0 or 1;

$R^{21}$ and $R^{23}$ each are independently selected from a substituted or unsubstituted $C_1$ to $C_6$ alkyl or a substituted or unsubstituted $C_2$ to $C_6$ alkenyl, in which a substituent for substitution is halogen;

$R^{22}$ is selected from a substituted or unsubstituted $C_1$ to $C_6$ alkylidene or a substituted or unsubstituted $C_2$ to $C_6$ alkenylene, in which a substituent for substitution is halogen; and when $A^{21}$, $A^{22}$, $A^{23}$, and $A^{24}$ are selected from the structural formulas represented by Formula (III-C), 2 or 4 of $A^{21}$, $A^{22}$, $A^{23}$, or $A^{24}$ are independently selected from the structural formulas represented by Formula (III-C) concurrently, every two structural formulas represented by Formula (III-C) can bond with each other to form a cyclic structure, and an O atom adjacent to

in Formula (III-C) is connected to a B atom at a center of Formula (III-A), wherein

represents a site of bonding with an adjacent atom.

2. The electrolytic solution according to claim 1, wherein the compounds represented by Formula (I-A) are at least one selected from compounds represented by Formula (I-A1), Formula (I-A2), Formula (I-A3), Formula (I-A4), Formula (I-A5), and Formula (I-A6):

(I-A1)

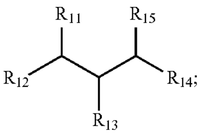

-continued (I-A2)

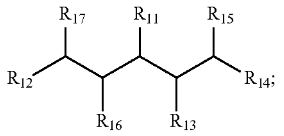

(I-A3)

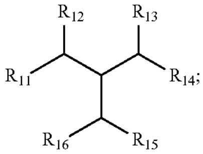

(I-A4)

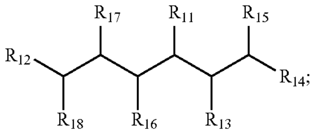

(I-A5)

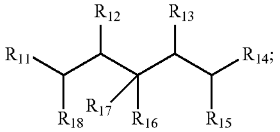

and (I-A6)

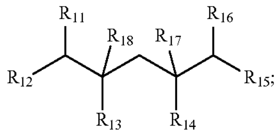

in Formula (I-A1), Formula (I-A2), Formula (I-A3), Formula (I-A4), Formula (I-A5), and Formula (I-A6), $R_{11}$, $R_{12}$, $R_{13}$, $R_{14}$, $R_{15}$, $R_{16}$, $R_{17}$, and $R_{18}$ each are independently selected from hydrogen, halogen, a cyano group,

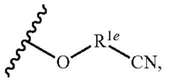

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution comprises at least one of the halogen, the cyano group, or

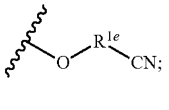

further, in each of Formula (I-A1), Formula (I-A2), Formula (I-A3), Formula (I-A4), Formula (I-A5), and Formula (I-A6), a number of —CN functional groups is 5 to 10, and a number of

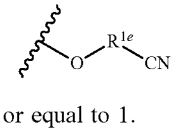

is greater than or equal to 1.

3. The electrolytic solution according to claim 1, wherein the compounds represented by Formula (I-A) are at least one selected from compounds represented by Formula (I-A7), Formula (I-A8), Formula (I-A9), and Formula (I-A10):

(I-A7)

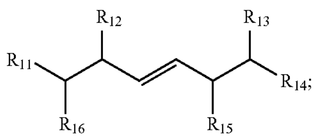

(I-A8)

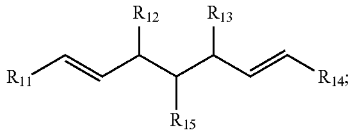

(I-A9)

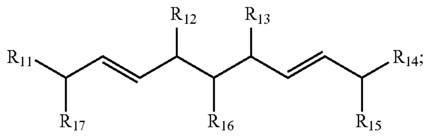

and (I-A10)

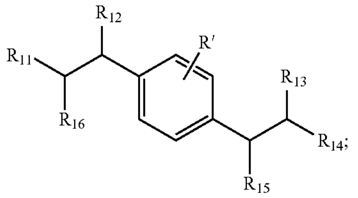

in Formula (I-A7), Formula (I-A8), Formula (I-A9), and Formula (I-A10), $R_{11}$, $R_{12}$, $R_{13}$, $R_{14}$, $R_{15}$, $R_{16}$, and $R_{17}$ each are independently selected from hydrogen, halogen, a cyano group,

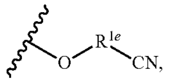

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, and R' is selected from hydrogen or a substituted or unsubstituted $C_1$ to $C_{10}$ alkyl, in which a substituent for substitution comprises at least one of the halogen, the cyano group, or

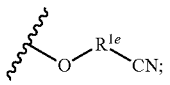

further, in each of Formula (I-A7), Formula (I-A8), Formula (I-A9), and Formula (I-A10), a number of —CN functional groups is 5 to 10, and a number of

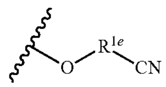

is greater than or equal to 1.

4. The electrolytic solution according to claim 1, wherein the compounds represented by Formula (I-A) comprise at least one of compounds represented by Formula (I-1) to Formula (I-20):

(I-1)

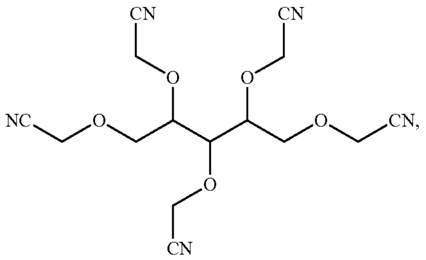

(I-2)

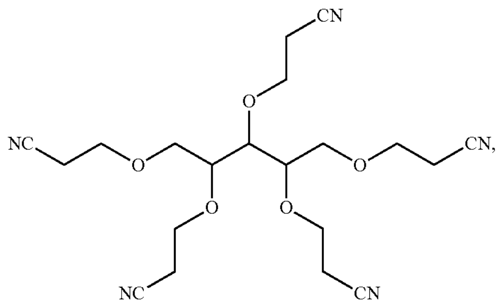

(I-3)

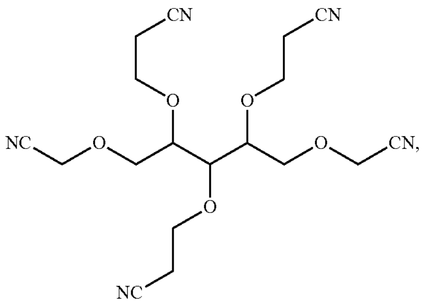

(I-4)

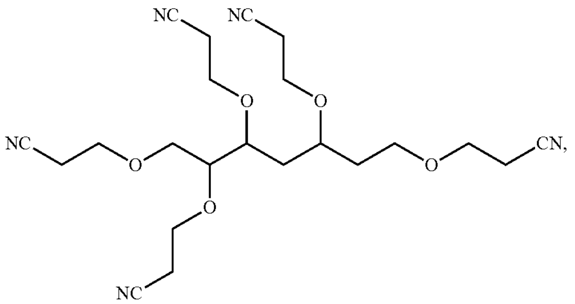

-continued
(I-5)
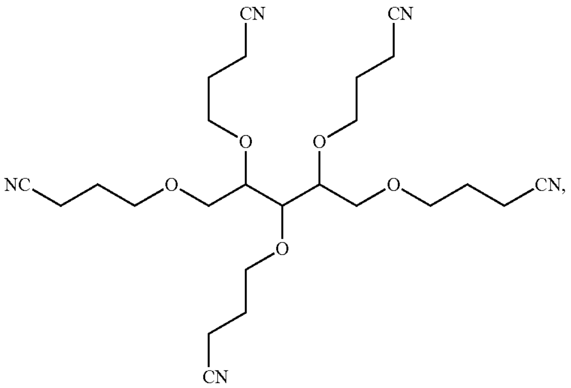
(I-6)
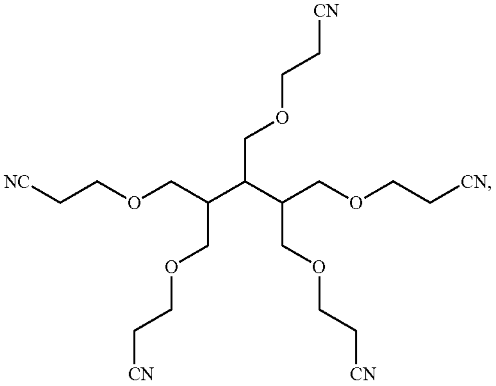
(I-7)
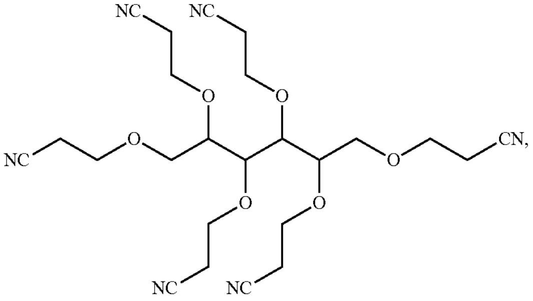
(I-8)
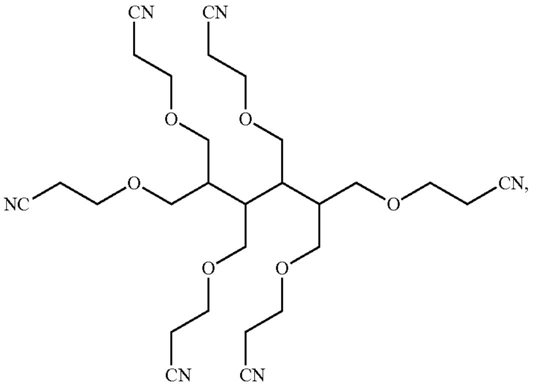
-continued
(I-9)
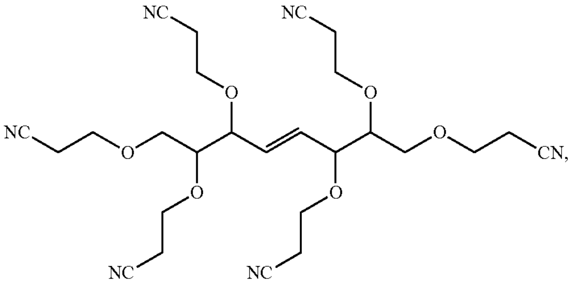
(I-10)
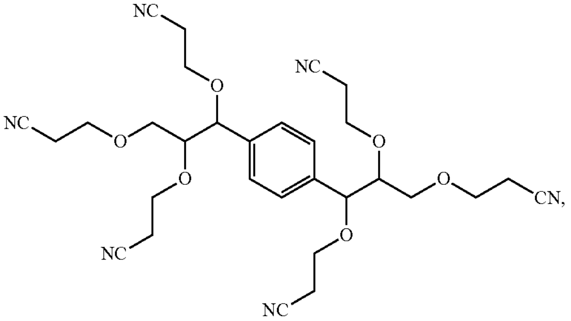
(I-11)
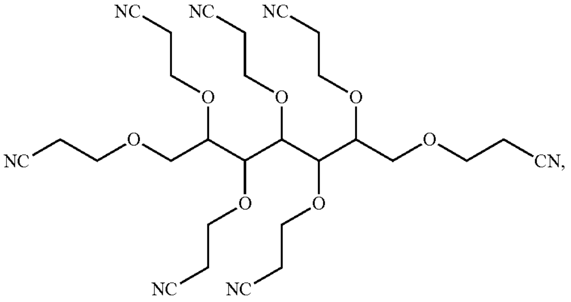
(I-12)
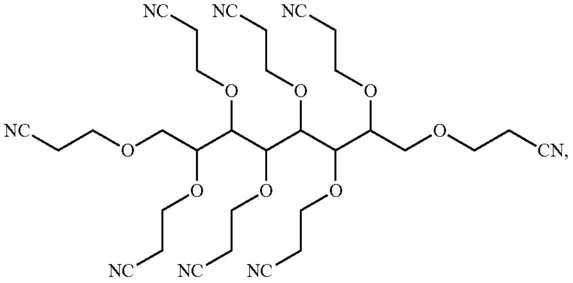
(I-13)
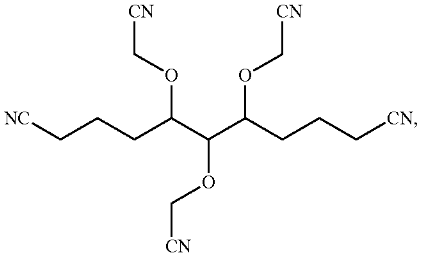

-continued (I-14)

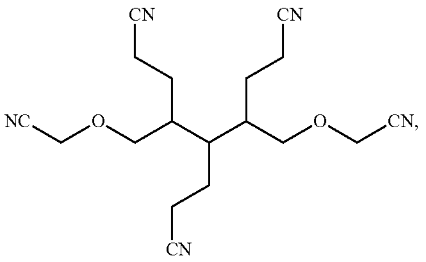

(I-15)

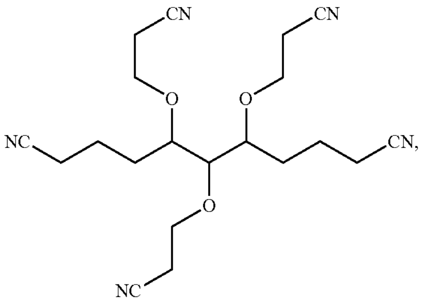

(I-16)

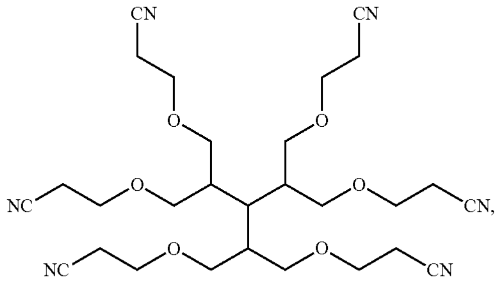

(I-17)

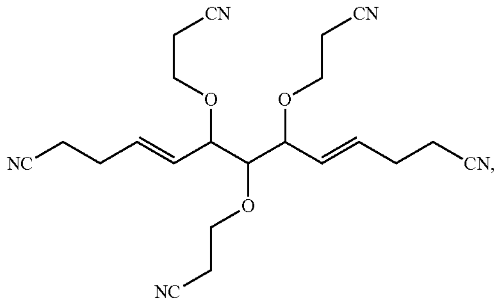

(I-18)

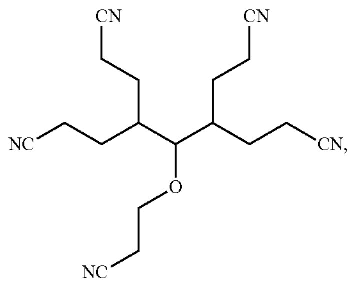

-continued (I-19)

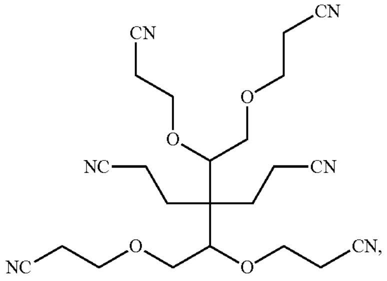

and (I-20)

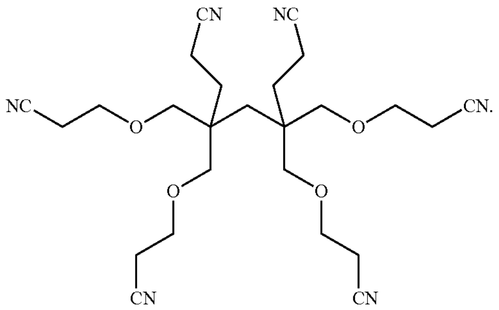

5. The electrolytic solution according to claim 1, wherein, based on a mass of the electrolytic solution, a weight percent of a compound represented by Formula (I-A) is 0.1% to 10%.

6. The electrolytic solution according to claim 5, wherein, based on the mass of the electrolytic solution, the weight percent of the compound represented by Formula (I-A) is 0.1% to 5%.

7. The electrolytic solution according to claim 1, wherein the electrolytic solution satisfies at least one of the following conditions:

(1) the compounds represented by Formula (II-A) comprise at least one of compounds represented by Formula (II-1) to Formula (II-12):

(II-1)

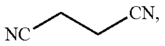

(II-2)

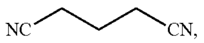

(II-3)

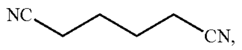

(II-4)

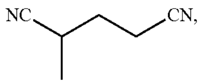

(II-5)

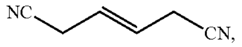

(II-6)

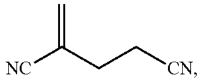

(II-7)

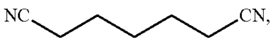

(II-8)

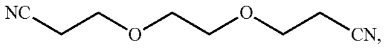

-continued (II-9)

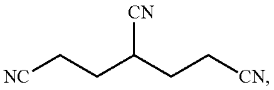

(II-10)

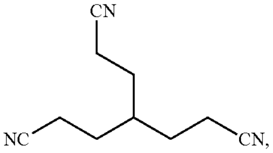

(II-11)

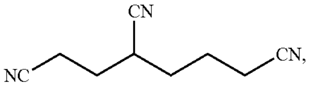

and (II-12)

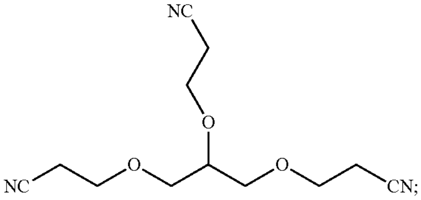

(2) based on a mass of the electrolytic solution, a weight percent of a compound represented by Formula (II-A) is 0.1% to 10%;

(3) a mass ratio of the compound represented by Formula (I-A) to the compound represented by Formula (II-A) is less than or equal to 1.

8. The electrolytic solution according to claim 1, wherein the compounds represented by Formula (III-A) comprise at least one of compounds represented by Formula (III-1) to Formula (III-12):

(III-1)

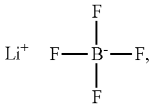

(III-2)

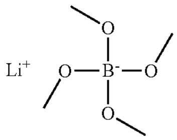

, (III-3)

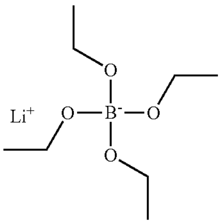

, (III-4)

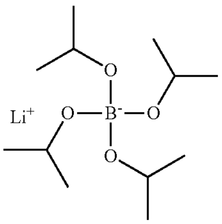

,

-continued (III-5)

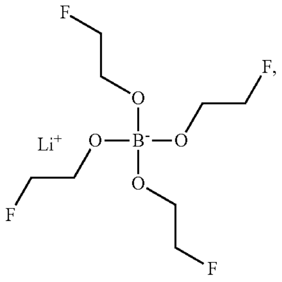

(III-6)

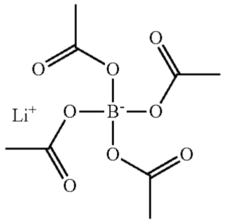

, (III-7)

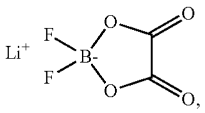

(III-8)

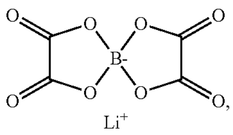

(III-9)

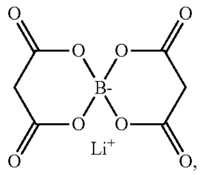

(III-10)

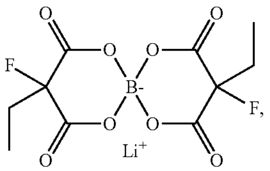

(III-11)

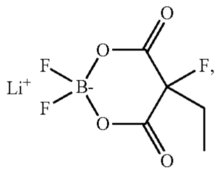

and (III-12)

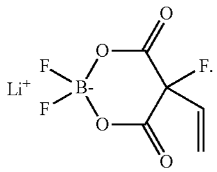

9. The electrolytic solution according to claim 1, wherein the electrolytic solution further comprises a compound containing a sulfur-oxygen double bond, and the compound containing a sulfur-oxygen double bond comprises at least one of compounds represented by Formula (IV-A) or Formula (IV-B):

(IV-A)

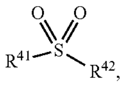

, and (IV-B)

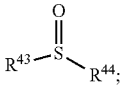

;

in Formula (IV-A) and Formula (IV-B), $R^{41}$, $R^{42}$, $R^{43}$, and $R^{44}$ each are independently selected from a substituted or unsubstituted $C_1$ to $C_5$ alkyl, a substituted or unsubstituted $C_2$ to $C_{10}$ alkenyl, a substituted or unsubstituted $C_2$ to $C_{10}$ alkynyl, a substituted or unsubstituted $C_3$ to $C_{10}$ alicyclic hydrocarbyl, a substituted or unsubstituted $C_6$ to $C_{10}$ aryl, or a substituted or unsubstituted $C_1$ to $C_6$ heterocyclic group, in which a substituent for substitution comprises at least one of halogen or a heteroatom-containing functional group; and, $R^{41}$ and $R^{42}$ are able to be bonded to form a cyclic structure, and $R^{43}$ and $R^{44}$ are able to be bonded to form a cyclic structure.

10. The electrolytic solution according to claim 9, wherein the compound containing a sulfur-oxygen double bond comprises at least one of compounds represented by Formula (IV-1) to Formula (IV-16):

(IV-1)

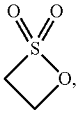

, (IV-2)

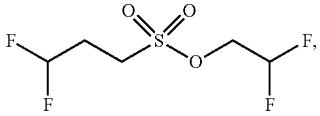

, (IV-3)

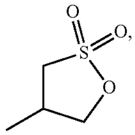

, (IV-4)

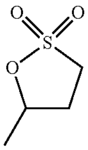

, (IV-5)

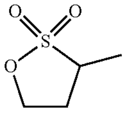

, (IV-6)

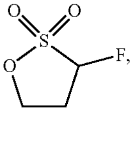

,

-continued (IV-7)

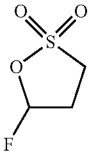

, (IV-8)

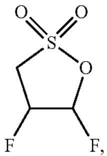

, (IV-9)

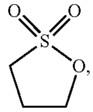

, (IV-10)

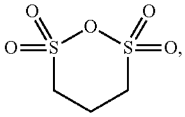

, (IV-11)

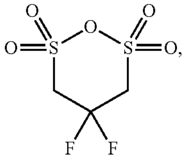

, (IV-13)

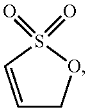

, (IV-14)

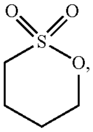

, (IV-15)

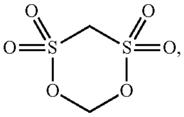

, and (IV-16)

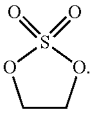

.

11. The electrolytic solution according to claim 1, wherein the electrolytic solution further comprises a lithium phosphate compound, and the lithium phosphate compound comprises at least one of lithium difluorophosphate, lithium difluorobisoxalate phosphate, or lithium tetrafluorooxalate phosphate.

12. An electrochemical device, comprising a positive electrode plate, a negative electrode plate, a separator, and an electrolytic solution, wherein the electrolytic solution comprises at least one of compounds represented by Formula (I-A):

(I-A)

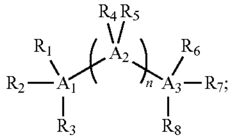

in Formula (I-A), n is an integer selected from 0 to 6;

A1, A2, and A3 each are a structural formula represented by Formula (I-B) or Formula (I-C):

(I-B)

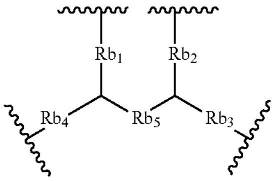

, and (I-C)

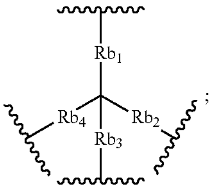

;

$R_1$, $R_2$, $R_3$, $R_4$, $R_5$, $R_6$, $R_7$, and $R_8$ each are independently selected from hydrogen, halogen, a cyano group,

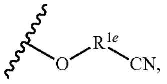

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution comprises at least one of the halogen, the cyano group, or

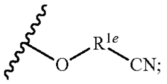

in Formula (I-A), a number of —CN functional groups is 5 to 10, and a number of

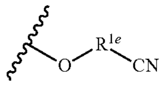

is greater than or equal to 1; and $R_{b1}$, $R_{b2}$, $R_{b3}$, $R_{b4}$, $R_{b5}$, and $R^{1e}$ each are independently selected from a covalent single bond, a substituted or unsubstituted $C_1$ to $C_{10}$ alkylidene, a substituted or unsubstituted $C_2$ to $C_{10}$ alkenylene, a substituted or unsubstituted $C_2$ to $C_{10}$ alkynylene, or a substituted or unsubstituted $C_6$ to $C_{10}$ arylene, in which a substituent for substitution is halogen, wherein

represents a site of bonding with an adjacent atom, wherein the electrolytic solution further comprises at least one of compounds represented by Formula (II-A):

(II-A)

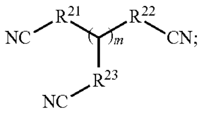

in Formula (II-A), m is selected from 0 or 1;

$R^{21}$, $R^{22}$, and $R^{23}$ each are independently selected from

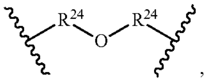

, a substituted or unsubstituted $C_1$ to $C_{10}$ alkylidene or a substituted or unsubstituted $C_2$ to $C_{10}$ alkenylene, in which a substituent for substitution is halogen; and $R^{24}$ and $R^{25}$ each are independently selected from a covalent bond, a substituted or unsubstituted $C_1$ to $C_{10}$ alkylidene, or a substituted or unsubstituted $C_2$ to $C_{10}$ alkenylene, in which a substituent for substitution is halogen, wherein,

represents a site of bonding with an adjacent atom; and wherein the electrolytic solution further comprises at least one of compounds represented by Formula (III-A):

(III-A)

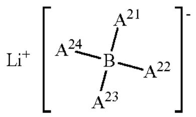

;

in Formula (III-A), $A^{21}$, $A^{22}$, $A^{23}$, and $A^{24}$ each are independently selected from halogen or a structural formula represented by Formula (III-B), Formula (III-C), or Formula (III-D):

(III-B)

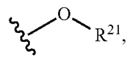

(III-C)

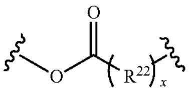

, and (III-D)

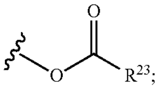

x is selected from 0 or 1;

$R^{21}$ and $R^{23}$ each are independently selected from a substituted or unsubstituted $C_1$ to $C_6$ alkyl or a substituted or unsubstituted $C_2$ to $C_6$ alkenyl, in which a substituent for substitution is halogen;

$R^{22}$ is selected from a substituted or unsubstituted $C_1$ to $C_6$ alkylidene or a substituted or unsubstituted $C_2$ to $C_6$ alkenylene, in which a substituent for substitution is halogen; and when $A^{21}$, $A^{22}$, $A^{23}$, and $A^{24}$ are selected from the structural formulas represented by Formula (III-C), 2 or 4 of $A^{21}$, $A^{22}$, $A^{23}$, or $A^{24}$ are independently selected from the structural formulas represented by Formula (III-C) concurrently, every two structural formulas represented by Formula (III-C) can bond with each other to form a cyclic structure, and an O atom adjacent to

in Formula (III-C) is connected to a B atom at a center of Formula (III-A), wherein

represents a site of bonding with an adjacent atom.

13. The electrochemical device according to claim 12, wherein the compounds represented by Formula (I-A) are at least one selected from compounds represented by Formula (I-A1), Formula (I-A2), Formula (I-A3), Formula (I-A4), Formula (I-A5), and Formula (I-A6):

(I-A1)

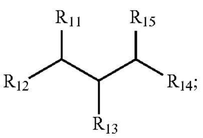

(I-A2)

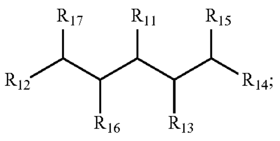

-continued (I-A3)

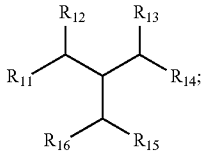

(I-A4)

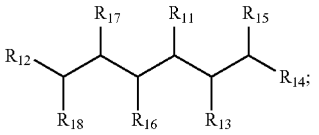

(I-A5)

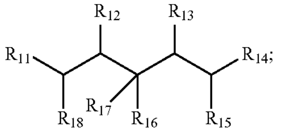

and (I-A6)

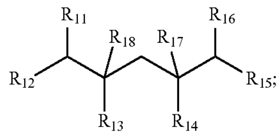

in Formula (I-A1), Formula (I-A2), Formula (I-A3), Formula (I-A4), Formula (I-A5), and Formula (I-A6), $R_{11}$, $R_{12}$, $R_{13}$, $R_{14}$, $R_{15}$, $R_{16}$, $R_{17}$, and $R_{18}$ each are independently selected from hydrogen, halogen, a cyano group,

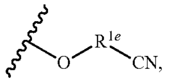

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution comprises at least one of the halogen, the cyano group, or

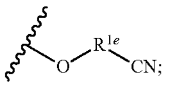

further, in each of Formula (I-A1), Formula (I-A2), Formula (I-A3), Formula (I-A4), Formula (I-A5), and Formula (I-A6), a number of —CN functional groups is 5 to 10, and a number of

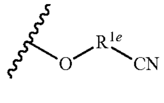

is greater than or equal to 1.

14. The electrochemical device according to claim 12, wherein the compounds represented by Formula (I-A) are at least one selected from compounds represented by Formula (I-A7), Formula (I-A8), Formula (I-A9), and Formula (I-A10):

(I-A7)

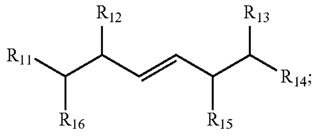

(I-A8)

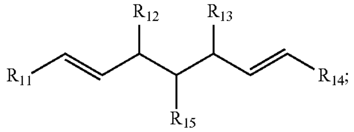

(I-A9)

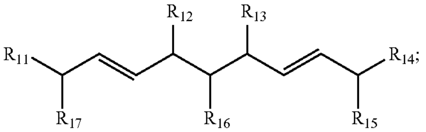

and (I-A10)

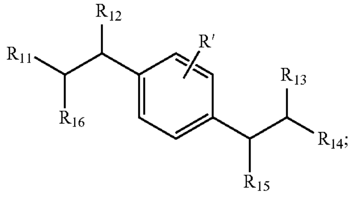

in Formula (I-A7), Formula (I-A8), Formula (I-A9), and Formula (I-A10), $R_{11}$, $R_{12}$, $R_{13}$, $R_{14}$, $R_{15}$, $R_{16}$, and $R_{17}$ each are independently selected from hydrogen, halogen, a cyano group,

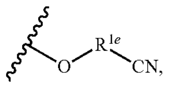

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, and R' is selected from hydrogen or a substituted or unsubstituted $C_1$ to $C_{10}$ alkyl, in which a substituent for substitution comprises at least one of the halogen, the cyano group, or

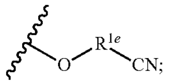

further, in each of Formula (I-A7), Formula (I-A8), Formula (I-A9), and Formula (I-A10), a number of —CN functional groups is 5 to 10, and a number of

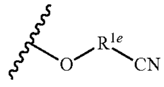

is greater than or equal to 1.

15. The electrochemical device according to claim 12, wherein the compounds represented by Formula (I-A) comprise at least one of compounds represented by Formula (I-1) to Formula (I-20):

(I-1)

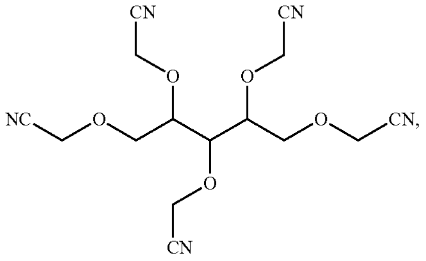

(I-2)

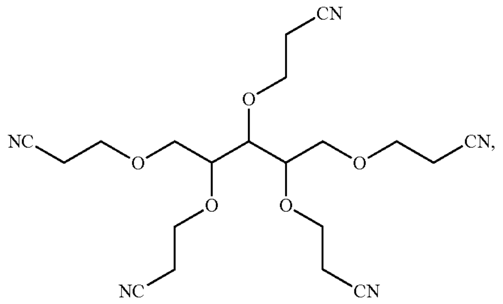

(I-3)

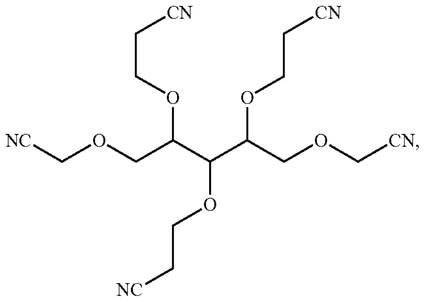

(I-4)

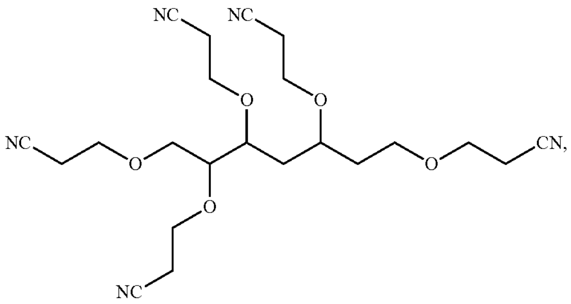

(I-5)

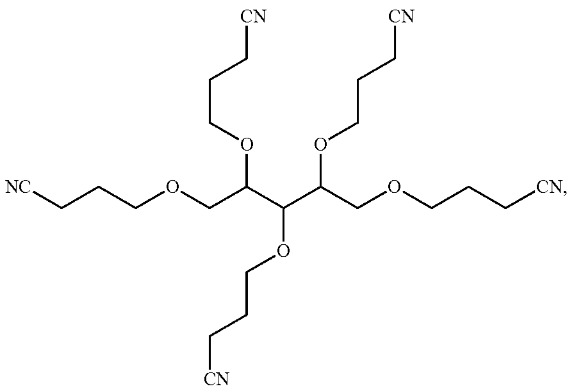

-continued
(I-6)
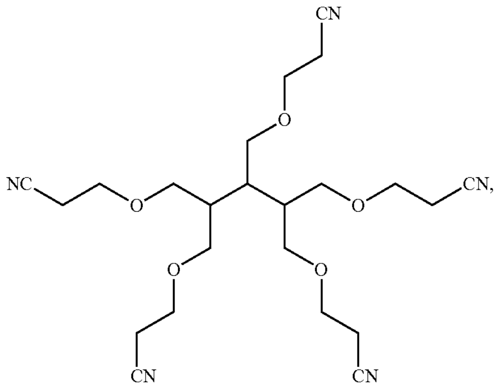
(I-7)
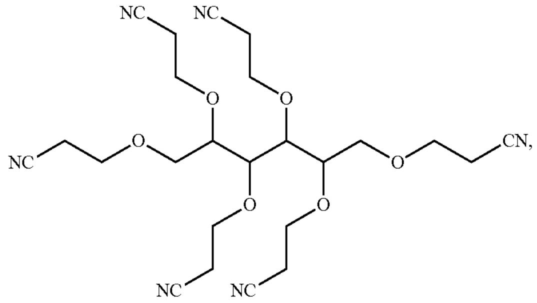
(I-8)
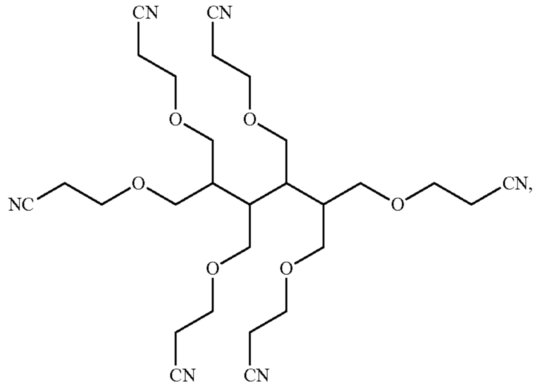
(I-9)
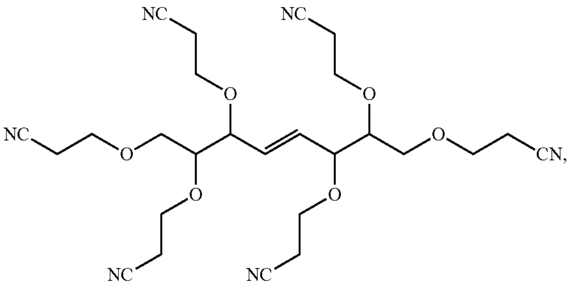
-continued
(I-10)
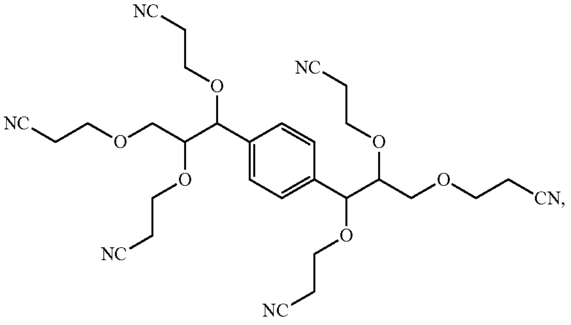
(I-11)
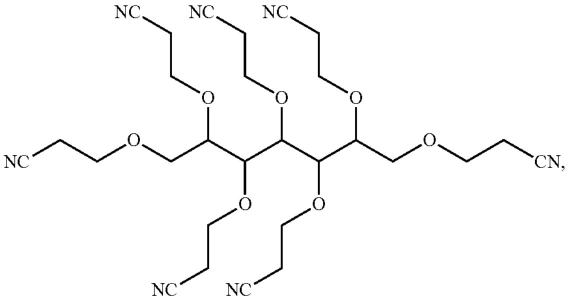
(I-12)
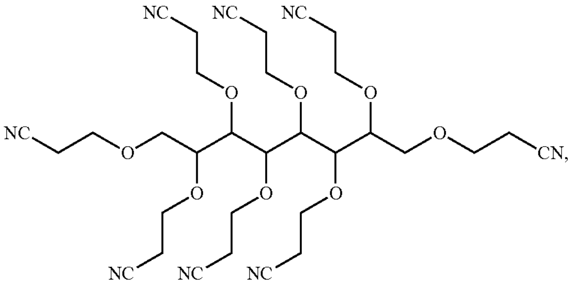
(I-13)
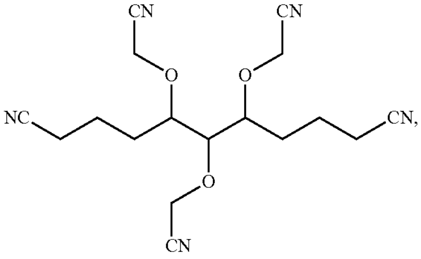
(I-14)
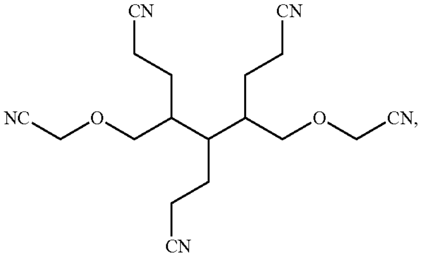

-continued

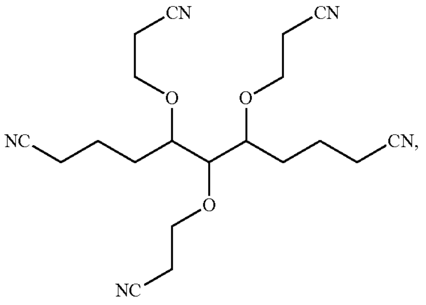
(I-15)

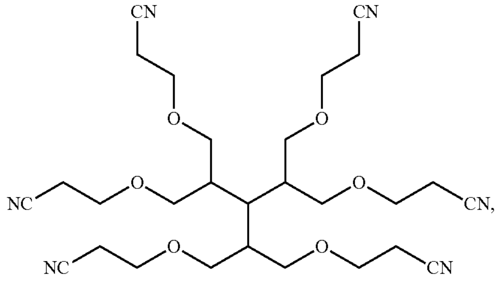
(I-16)

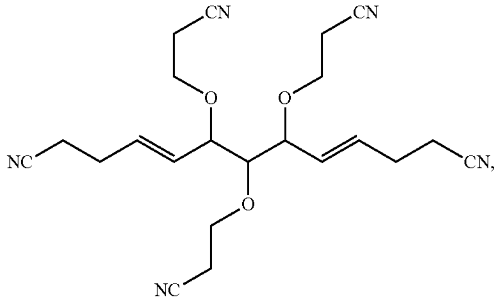
(I-17)

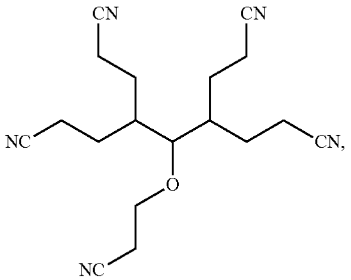
(I-18)

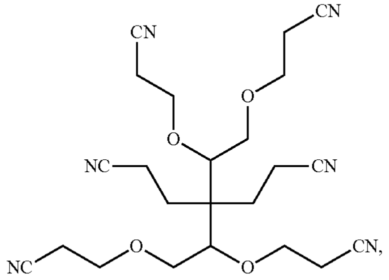
(I-19)

and

-continued

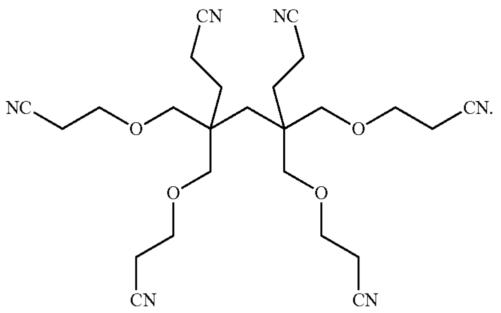
(I-20)

16. The electrochemical device according to claim 12, wherein, based on a mass of the electrolytic solution, a weight percent of a compound represented by Formula (I-A) is 0.1% to 10%.

17. An electronic device, comprising an electrochemical device, wherein the electrochemical device comprises a positive electrode plate, a negative electrode plate, a separator, and an electrolytic solution, wherein the electrolytic solution comprises at least one of compounds represented by Formula (I-A):

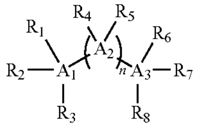
(I-A)

in Formula (I-A), n is an integer selected from 0 to 6;

A1, A2, and A3 each are a structural formula represented by Formula (I-B) or Formula (I-C):

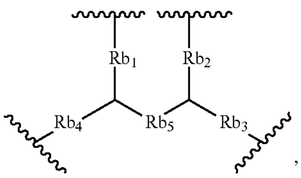
(I-B)

, and

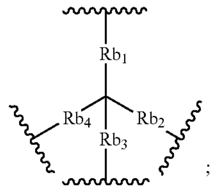
(I-C)

;

$R_1$, $R_2$, $R_3$, $R_4$, $R_5$, $R_6$, $R_7$, and $R_8$ each are independently selected from hydrogen, halogen, a cyano group,

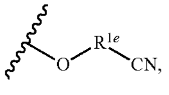

a substituted or unsubstituted $C_1$ to $C_{10}$ alkyl, a substituted or unsubstituted $C_2$ to $C_{10}$ alkenyl, a substituted or unsubstituted $C_2$ to $C_{10}$ alkynyl, or a substituted or unsubstituted $C_6$ to $C_{10}$ aryl, in which a substituent for substitution comprises at least one of the halogen, the cyano group, or

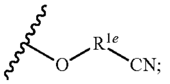

in Formula (I-A), a number of —CN functional groups is 5 to 10, and a number of

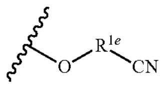

is greater than or equal to 1; and $R_{b1}$, $R_{b2}$, $R_{b3}$, $R_{b4}$, $R_{b5}$, and $R^{1e}$ each are independently selected from a covalent single bond, a substituted or unsubstituted $C_1$ to $C_{10}$ alkylidene, a substituted or unsubstituted $C_2$ to $C_{10}$ alkenylene, a substituted or unsubstituted $C_2$ to $C_{10}$ alkynylene, or a substituted or unsubstituted $C_6$ to $C_{10}$ arylene, in which a substituent for substitution is halogen, wherein

represents a site of bonding with an adjacent atom, wherein the electrolytic solution further comprises at least one of compounds represented by Formula (II-A):

(II-A)

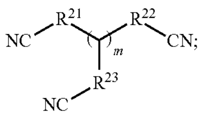

in Formula (II-A), m is selected from 0 or 1;

$R^{21}$, $R^{22}$, and $R^{23}$ each are independently selected from

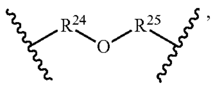

a substituted or unsubstituted $C_1$ to $C_{10}$ alkylidene or a substituted or unsubstituted $C_2$ to $C_{10}$ alkenylene, in which a substituent for substitution is halogen; and $R^{24}$ and $R^{25}$ each are independently selected from a covalent bond, a substituted or unsubstituted $C_1$ to $C_{10}$ alkylidene, or a substituted or unsubstituted $C_2$ to $C_{10}$ alkenylene, in which a substituent for substitution is halogen, wherein,

represents a site of bonding with an adjacent atom; and wherein the electrolytic solution further comprises at least one of compounds represented by Formula (III-A):

(III-A)

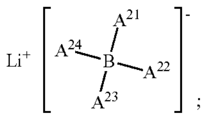

in Formula (III-A), $A^{21}$, $A^{22}$, $A^{23}$, and $A^{24}$ each are independently selected from halogen or a structural formula represented by Formula (III-B), Formula (III-C), or Formula (III-D):

(III-B)

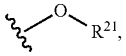

(III-C)

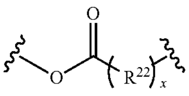

, and (III-D)

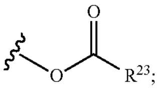

x is selected from 0 or 1;

$R^{21}$ and $R^{23}$ each are independently selected from a substituted or unsubstituted $C_1$ to $C_6$ alkyl or a substituted or unsubstituted $C_2$ to $C_6$ alkenyl, in which a substituent for substitution is halogen;

$R^{22}$ is selected from a substituted or unsubstituted $C_1$ to $C_6$ alkylidene or a substituted or unsubstituted $C_2$ to $C_6$ alkenylene, in which a substituent for substitution is halogen; and when $A^{21}$, $A^{22}$, $A^{23}$, and $A^{24}$ are selected from the structural formulas represented by Formula (III-C), 2 or 4 of $A^{21}$, $A^{22}$, $A^{23}$, or $A^{24}$ are independently selected from the structural formulas represented by Formula (III-C) concurrently, every two structural formulas represented by Formula (III-C) can bond with each other to form a cyclic structure, and an O atom adjacent to

in Formula (III-C) is connected to a B atom at a center of Formula (III-A), wherein
represents a site of bonding with an adjacent atom.
* * * * *